US012763937B2

(12) United States Patent
Dande et al.

(10) Patent No.: US 12,763,937 B2
(45) Date of Patent: Oct. 13, 2026

(54) PRO-ACTIVE ANOMALY DETECTION USING METADATA-BASED PREVIEW OF MULTI-LEVEL TOKEN MIX-UP DATA AUGMENTATION

(71) Applicant: Bank of America Corporation, Charlotte, NC (US)

(72) Inventors: Pratap Dande, Saint Johns, FL (US); Patricia A. Medeiros, Barrington, RI (US); KaShaun Leak, Stalling, NC (US); Janardhan R. Garlapati, Little Elm, TX (US); Ratnakar D. Madduri, Charlotte, NC (US); Ramon Guerrero, Garland, TX (US); Murali Bharathan, Simi Valley, CA (US); Naga Vamsi Krishna Akkapeddi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 35 days.

(21) Appl. No.: 19/059,715

(22) Filed: Feb. 21, 2025

(65) Prior Publication Data

US 2026/0254621 A1 Aug. 27, 2026

(51) Int. Cl.

| | |
|---|---|
| ***H04L 9/40*** | (2022.01) |
| ***H04L 9/08*** | (2006.01) |
| ***H04L 9/32*** | (2006.01) |

(52) U.S. Cl.

CPC .......... *H04L 9/0852* (2013.01); *H04L 9/3213* (2013.01)

(58) Field of Classification Search

CPC ............................ H04L 9/0852; H04L 9/3213

See application file for complete search history.

(56) References Cited

U.S. PATENT DOCUMENTS

| | | | |
|---|---|---|---|
| 8,799,278 B2 | 8/2014 | Blount et al. | |
| 8,805,938 B2 * | 8/2014 | Yu | G06F 9/546 709/206 |
| 9,436,839 B2 * | 9/2016 | Davis | H04L 63/0807 |
| 10,263,776 B2 * | 4/2019 | Kuris | H04L 9/0897 |
| 11,257,083 B1 | 2/2022 | Perkins et al. | |

(Continued)

*Primary Examiner* — Thaddeus J Plecha

(74) *Attorney, Agent, or Firm* — Banner & Witcoff, Ltd.

(57) ABSTRACT

This invention relates to a quantum cloud-based processing system for managing transaction data across multi-application environments with enhanced security, adaptability, and efficiency. The system receives transaction data and metadata, encrypts it using dynamically generated quantum encryption keys, and queries downstream applications to retrieve data structure requirements. It creates a hierarchical map to trace data transformations, tokenizes data into standardized units with encoded metadata, and performs multi-level data augmentation using advanced machine learning techniques. The system ensures seamless integration with applications through a soft commit mechanism, detects and categorizes anomalies, and generates comprehensive discrepancy and anomaly impact reports. Dynamic updating modules adapt to changes in application requirements, while logging and storage modules maintain secure and auditable records of all workflows. This invention addresses the complexities of managing sensitive transaction data, ensuring integrity, compliance, and scalability in diverse, high-volume environments.

20 Claims, 5 Drawing Sheets

(56) References Cited

U.S. PATENT DOCUMENTS

| | | | | |
|---|---|---|---|---|
| 11,989,287 | B2 * | 5/2024 | Mohanty | G06F 11/302 |
| 12,072,784 | B2 | 8/2024 | Dupont et al. | |
| 12,112,209 | B2 * | 10/2024 | Parthasarathy | G06F 11/3438 |
| 2019/0294485 | A1 | 9/2019 | Kukreja et al. | |
| 2022/0318624 | A1 | 10/2022 | Natsumeda et al. | |
| 2023/0072607 | A1 | 3/2023 | Bawa et al. | |
| 2023/0409412 | A1 | 12/2023 | Kruegel et al. | |
| 2024/0355338 | A1 | 10/2024 | Fersch et al. | |

* cited by examiner

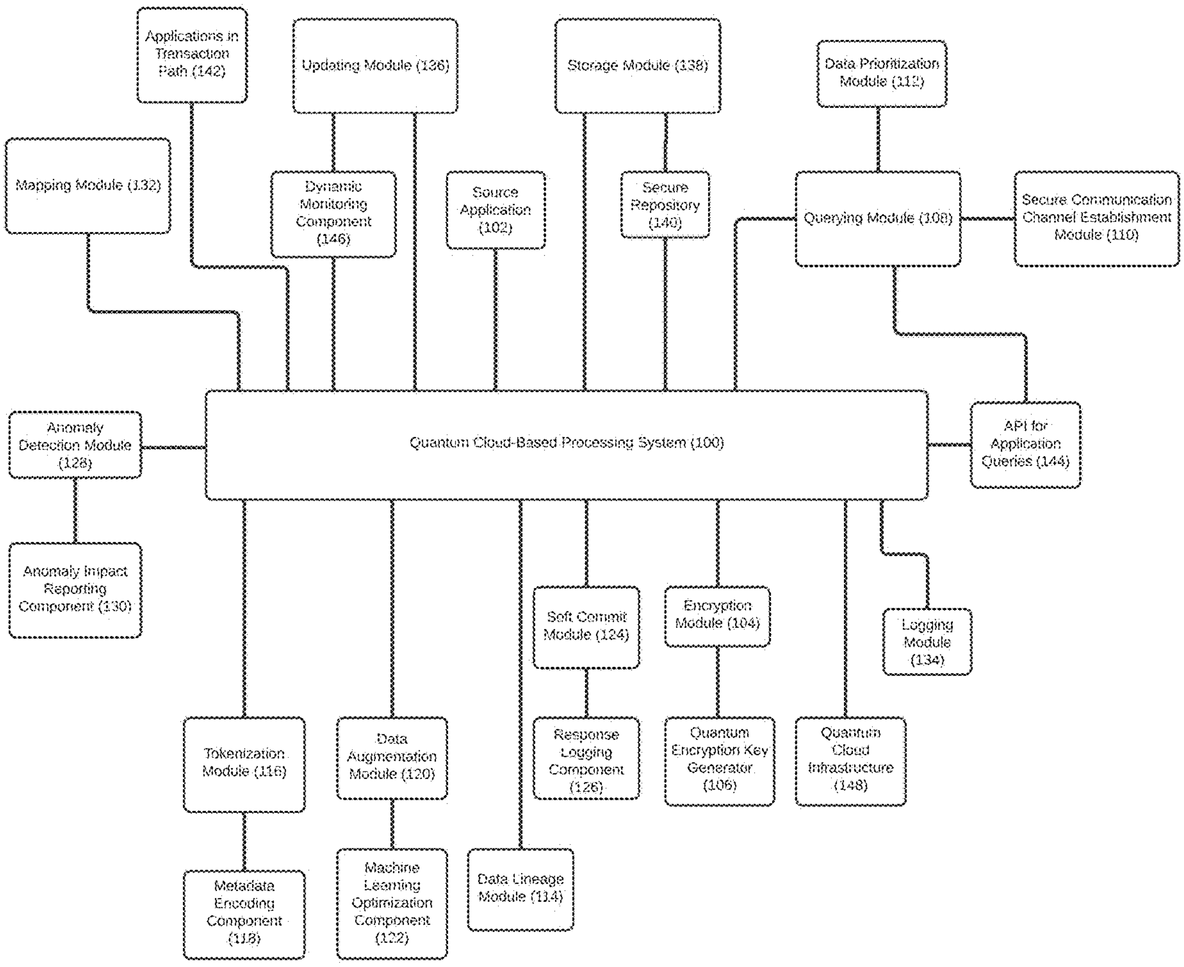
FIG. 1: Sample System Architecture Diagram

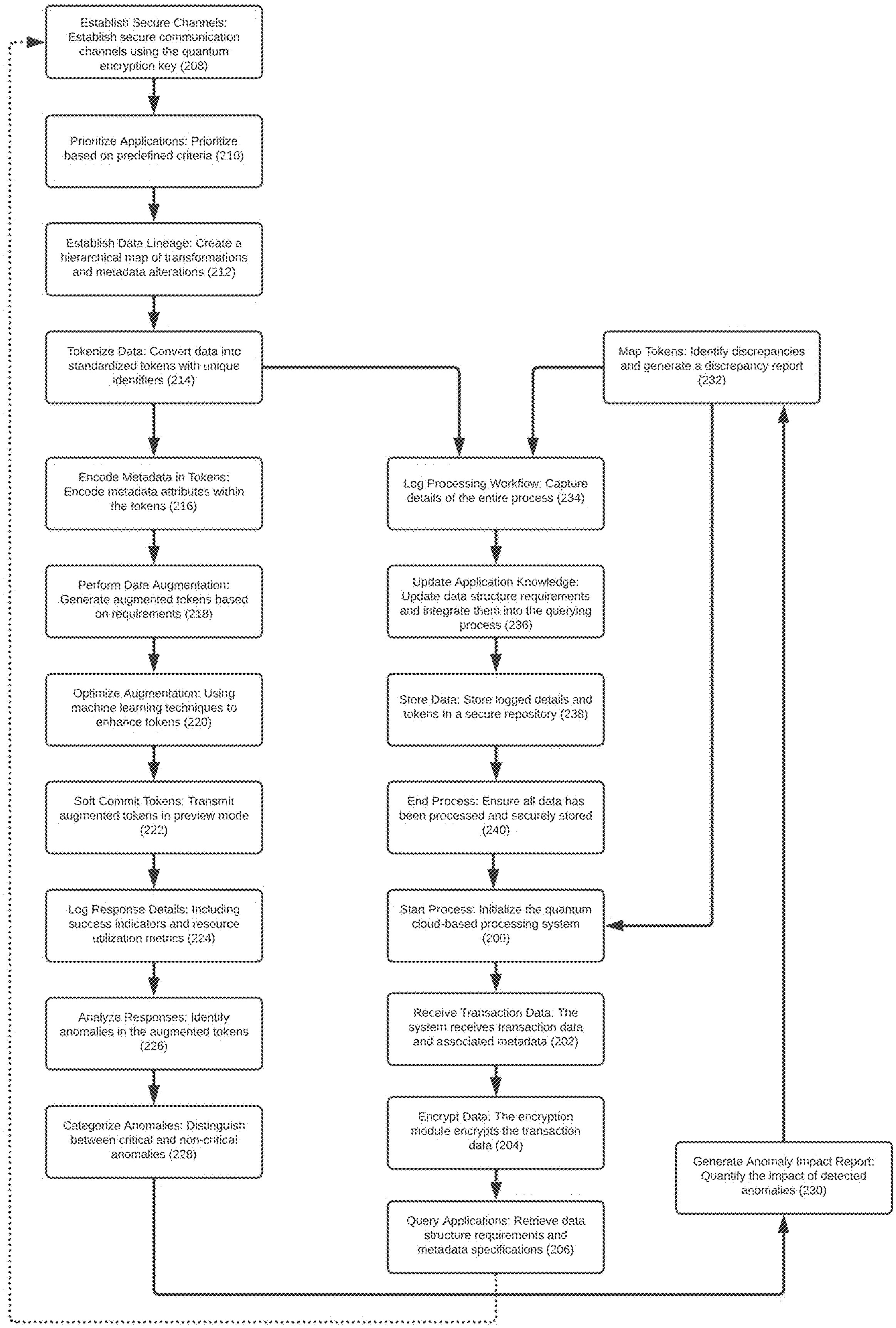
FIG. 2: Sample Flow Diagram

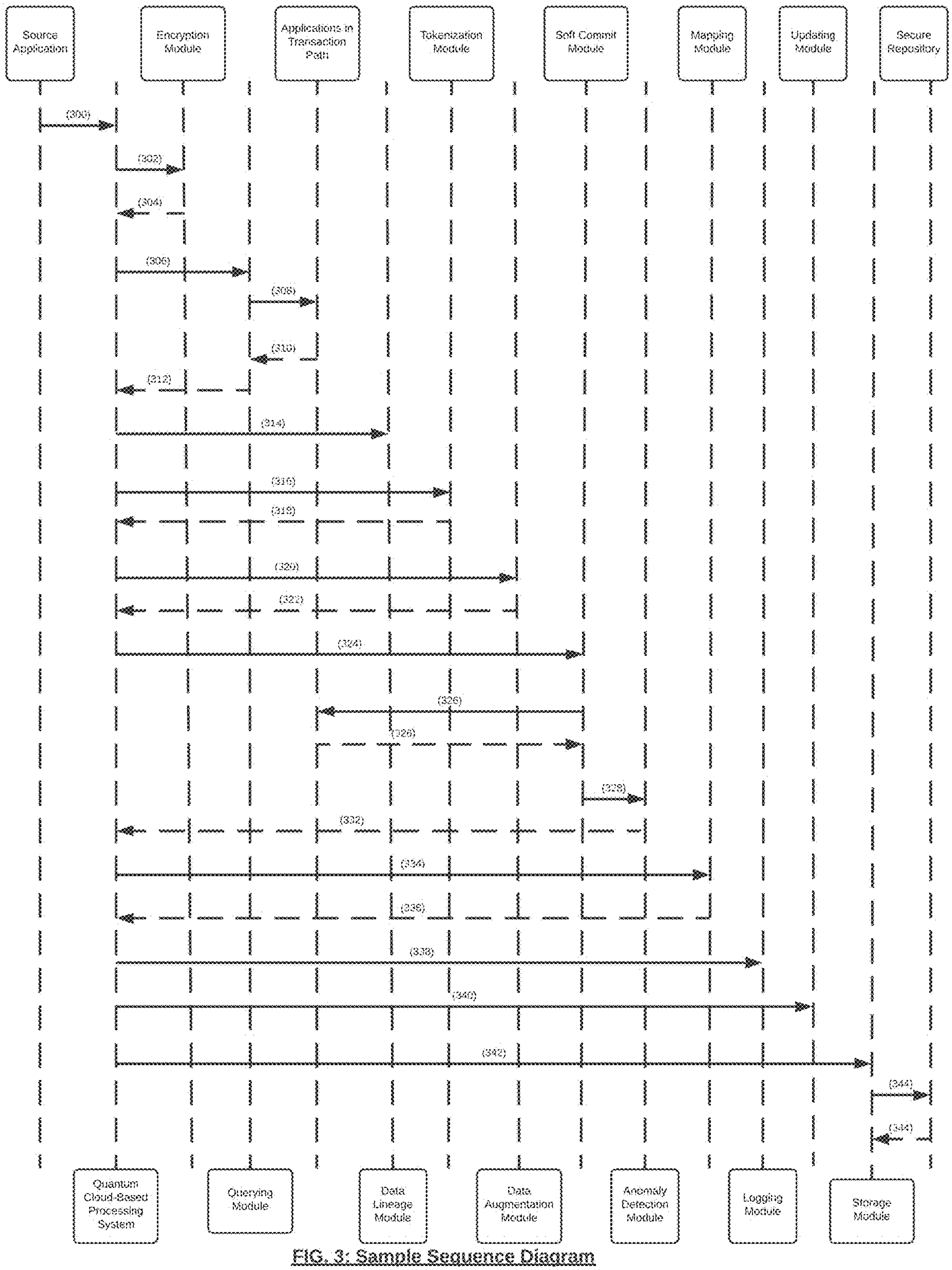
FIG. 3: Sample Sequence Diagram

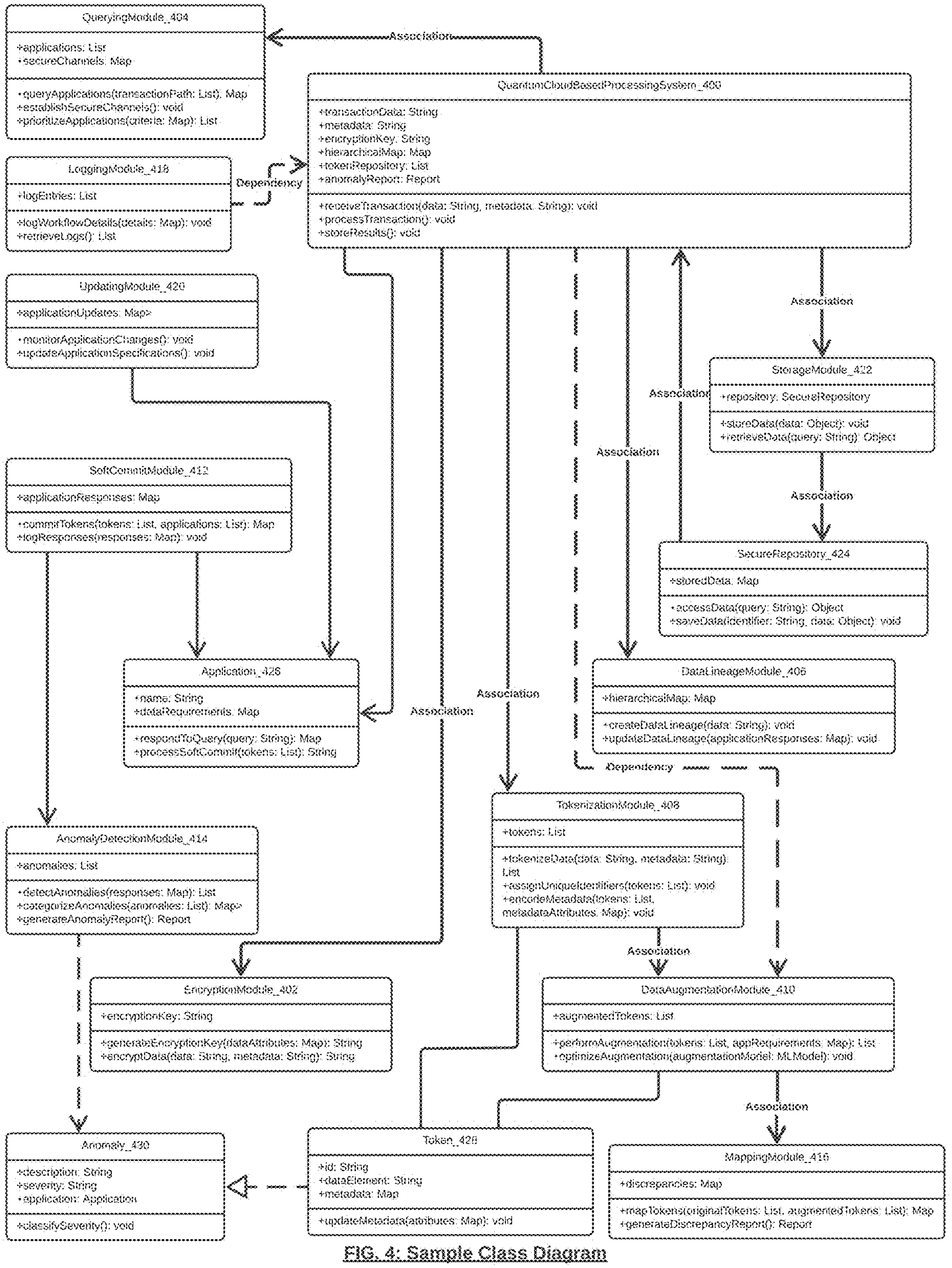
FIG. 4: Sample Class Diagram

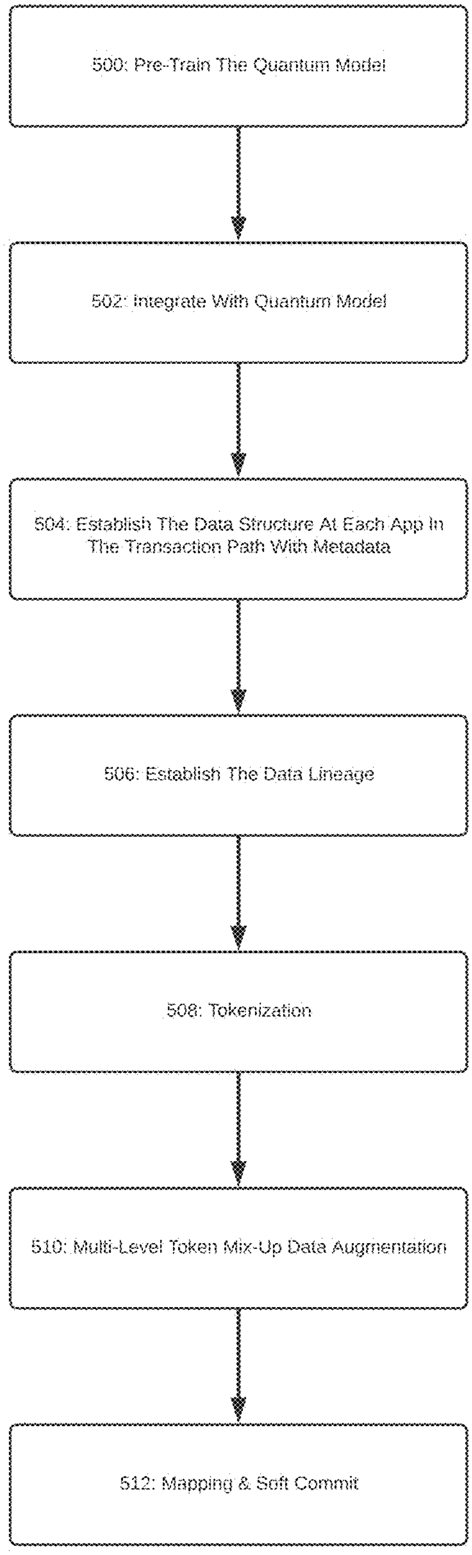
FIG. 5: High-Level Solution Diagram

PRO-ACTIVE ANOMALY DETECTION USING METADATA-BASED PREVIEW OF MULTI-LEVEL TOKEN MIX-UP DATA AUGMENTATION

TECHNICAL FIELD

The inventions disclosed herein pertain to the fields of cryptography and secure communication systems, data processing and database management, artificial intelligence and machine learning, error detection and recovery systems, and distributed computing systems. The invention employs dynamically generated quantum encryption keys and secure communication channels to protect sensitive transaction data and metadata, ensuring data integrity and confidentiality. It incorporates systems for tokenizing data, generating hierarchical maps of data transformations, and dynamically updating application-specific requirements, while leveraging advanced logging and storage mechanisms to manage data securely and efficiently. Machine learning techniques, including generative adversarial networks, are utilized to optimize data augmentation processes and refine token transformations, enhancing adaptability and efficiency in meeting application-specific requirements. Additionally, the invention includes an anomaly detection module for identifying and categorizing discrepancies, generating impact reports, and enabling targeted corrective actions to maintain data integrity. By leveraging a quantum cloud-based infrastructure, the system dynamically allocates resources to process data across multiple applications, ensuring scalability, reliability, and optimal performance in complex, high-volume workflows.

DESCRIPTION OF THE RELATED ART

In complex transactional environments, data must often traverse multiple applications before final processing. Each application in the transaction path may perform specific functions such as validation, categorization, enhancement, aggregation, or transformation of the data. This multi-stage journey introduces significant challenges as the data is repeatedly modified and re-evaluated, creating potential points of failure. When the transaction data encounters an issue, such as format incompatibilities or missing elements, the entire process may stall, resulting in delays, errors, or outright failures. Such interruptions often necessitate manual intervention or system restarts, which are time consuming and resource intensive.

One of the primary challenges in such environments is ensuring that the data remains compatible with the requirements of each application in the transaction path. Applications often rely on rigid data structures, and even minor discrepancies in datatype, size, or metadata can cause processing errors. These errors can cascade downstream, leading to corrupted data, incomplete transactions, or unanticipated system behavior. Furthermore, the detection of these errors often occurs late in the process, after substantial computational and system resources have already been expended.

Another critical issue is the lack of real-time visibility into the behavior of data as it moves through the transaction path. Systems traditionally rely on post-error diagnostics to identify and rectify issues, which delays resolution and contributes to inefficiencies. Without a preview mechanism, applications are left reacting to problems rather than proactively addressing them. This reactive approach increases the likelihood of failed transactions and system downtime, both of which have significant operational and financial implications for businesses.

Data integrity also becomes a concern in these environments. As transaction data undergoes multiple transformations, ensuring that the final output accurately reflects the original input is paramount. Errors introduced during any stage of the process can compromise the integrity of the data, leading to inaccurate results or unintended consequences. Moreover, data lineage—the ability to trace the origin and transformation history of data—often remains undocumented, making it challenging to identify where issues originate.

The issue is further exacerbated by the diverse ecosystem of applications that process transaction data. Each application may use unique protocols, formats, and metadata structures, increasing the complexity of ensuring compatibility across systems. These differences often necessitate custom integrations and configurations, which are costly to develop and maintain. Additionally, as new applications or updates are introduced, existing configurations may become obsolete, requiring frequent revalidation of the transaction workflow.

Data security is another pressing problem. Sensitive transaction data must be protected at every stage of its journey, yet traditional methods often lack robust mechanisms for secure and efficient data handling. The risk of unauthorized access or data breaches increases as data passes through multiple systems, each with its own vulnerabilities. Ensuring secure transmission, storage, and processing across this diverse environment remains a persistent challenge.

Scalability poses yet another difficulty, especially for systems that handle large volumes of transactions. As the number of transactions grows, so does the potential for errors, delays, and inefficiencies. Systems must be capable of scaling seamlessly while maintaining accuracy and reliability. However, traditional approaches to error detection and data validation often struggle to keep pace with increasing transactional demands, resulting in bottlenecks and reduced performance.

Existing solutions often focus on addressing errors after they have occurred rather than preventing them in the first place. This lack of a proactive approach limits the ability of systems to operate efficiently, particularly in dynamic and high-stakes environments such as financial transactions and supply chain management. Furthermore, traditional methods do not account for the nuanced and evolving requirements of modern transactional systems, leaving gaps in their effectiveness.

There is also a lack of standardization in how anomalies are identified and addressed. Different applications may define and handle errors in distinct ways, creating inconsistencies across the transaction path. This inconsistency not only complicates error resolution but also makes it difficult to implement a unified strategy for anomaly detection and prevention. Consequently, systems are often plagued by recurring issues that hinder overall performance and reliability.

Another issue lies in the inability to simulate the transactional flow accurately before execution. Without a mechanism to preview the potential outcomes of a transaction, organizations are forced to rely on trial-and-error approaches, which are inefficient and costly. The absence of accurate simulation tools limits the ability to foresee and mitigate issues, resulting in avoidable errors and disruptions.

The challenge of handling diverse and evolving transaction requirements further complicates the situation. Transaction paths often involve legacy systems, modern applications, and third-party integrations, each with its own constraints and expectations. Balancing these diverse requirements without introducing new vulnerabilities or inefficiencies is a daunting task for traditional systems.

Additionally, traditional methods lack the flexibility to adapt to changing transaction scenarios in real time. As transaction data is influenced by dynamic factors such as user inputs, regulatory changes, or external conditions, systems must be capable of responding dynamically. However, most existing approaches fail to offer this level of adaptability, leaving them ill-equipped to handle the complexities of modern transactional environments.

The lack of transparency in transaction processing further compounds these challenges. Stakeholders often have limited insight into the state of a transaction at any given point, making it difficult to diagnose and address issues effectively. This lack of visibility increases uncertainty and undermines trust in the system's reliability, particularly in mission-critical applications.

The absence of a robust mechanism for anomaly detection also impacts long-term system maintenance and optimization. Without accurate insights into where and why issues occur, it becomes challenging to improve system performance or prevent recurring errors. This limits the ability of organizations to optimize their transaction workflows and achieve higher levels of operational efficiency.

There is a long-felt and unmet need for a solution that addresses these challenges by providing proactive anomaly detection, real-time transaction previews, and enhanced data integrity measures. Traditional approaches have failed to deliver a comprehensive mechanism for identifying and mitigating issues early in the transaction path. The inability to simulate, validate, and secure transaction data effectively has left organizations grappling with inefficiencies, errors, and vulnerabilities. A system capable of addressing these issues holistically would represent a significant advancement, enabling seamless, secure, and reliable transaction processing across diverse applications.

SUMMARY OF THE INVENTION

The invention provides a transformative approach to managing transaction data as it moves through complex multi-application systems by introducing a quantum cloud-based model to preemptively address issues that arise during data processing. At its core, the invention leverages a multi-step process to ensure transaction data maintains structural and semantic integrity across various stages of validation, transformation, and recording. The quantum cloud model is pre-trained with comprehensive knowledge of transaction types, paths, and participating applications, ensuring it can simulate and predict the behavior of data at each stage. This pre-training allows the system to act as an intelligent intermediary, capable of understanding the unique requirements and attributes of each application in the transaction path.

The invention integrates with the source application to receive transaction details, metadata, and associated data elements securely via a quantum-encrypted API. This ensures not only the integrity of the transmitted data but also its security throughout the process. Once the transaction data is submitted, the quantum model queries each application in the transaction path in real-time, extracting detailed information about the structure, attributes, and metadata of the data elements they handle. This querying process is designed to provide a granular understanding of how data is expected to behave and transform within each application, allowing the system to build a dynamic model of the data's journey.

To further enhance its capabilities, the invention establishes a comprehensive data lineage for each transaction. By tracing the transformations, translations, and enhancements that data undergoes, the system creates a robust map of the transaction path. This lineage includes detailed insights into data structures, attribute changes, and metadata behaviors, which are critical for accurately predicting potential issues. Through this mapping, the quantum model develops a complete picture of the transaction data's lifecycle, preparing it for the next stage of processing.

One of the most innovative aspects of the invention is its tokenization process. Both the source transaction data and the information gathered from target applications are converted into unique tokens. These tokens encapsulate the data elements and their associated metadata, creating a standardized representation that can be easily manipulated and analyzed. The tokenization process ensures that all data elements are treated uniformly, regardless of their origin or destination, enabling the system to perform complex operations with precision and consistency.

Building upon the tokenization process, the invention performs a multi-level token mix-up data augmentation. This process generates augmented data tokens for each level in the transaction path, where each level corresponds to a specific application. The token mix-up algorithm combines existing tokens with newly created ones to mimic the data transformations expected at each stage. This augmentation process is guided by the attributes and metadata gathered during the querying phase, ensuring that the generated data accurately reflects the requirements of each application. The multi-level approach allows the system to simulate the behavior of transaction data across all applications, providing a detailed preview of how the data will perform.

A critical feature of the invention is its ability to perform soft commits of augmented data tokens to target applications. Unlike hard commits, which permanently alter the application's data, soft commits provide a temporary and non-disruptive way to test the augmented data. By sending the augmented tokens to the target applications in a preview mode, the system can observe their behavior and identify any issues without impacting the application's normal operations. This soft commit mechanism preserves the integrity of the applications while providing valuable insights into the augmented data.

The system uses the results of the soft commits to detect anomalies in the transaction data. These anomalies may include missing data elements, structural mismatches, or unexpected transformations. By analyzing the feedback from the target applications, the invention identifies potential errors and generates actionable insights to resolve them. This proactive anomaly detection ensures that transaction data is optimized before it reaches its final destination, reducing the likelihood of errors and reprocessing.

Another unique aspect of the invention is its use of the TokenMixup algorithm for data augmentation. This attention-guided method maximizes the quality of augmented data by ensuring that it closely resembles real transaction data. The TokenMixup algorithm enhances the system's ability to generate high-quality data tokens, which are essential for accurate simulations and anomaly detection. By focusing on data quality, the invention ensures that the augmented data is a reliable representation of the transaction's expected behavior.

The invention also incorporates advanced mapping techniques to compare augmented data tokens with the original data and metadata from the source and target applications. This mapping process verifies the accuracy of the augmented data and identifies discrepancies that may lead to errors. The ability to map and validate data across multiple applications is a key feature that distinguishes this invention from traditional systems, which often lack such comprehensive verification mechanisms.

A further inventive feature of the system is its capability to generate detailed logs during the soft commit process. These logs provide a transparent view of how the augmented data interacts with each application, including any errors or irregularities that arise. By analyzing these logs, the system gains additional insights into the behavior of transaction data, enabling it to refine its predictions and corrections. This logging mechanism adds an additional layer of visibility and control to the transaction process.

The invention also emphasizes security and efficiency through the use of quantum encryption. All communications between the source application, quantum model, and target applications are secured using quantum-encrypted APIs, ensuring that sensitive transaction data remains protected throughout the process. This focus on security is particularly important for systems handling confidential or regulated data, where breaches or non-compliance can have severe consequences.

Scalability is another notable feature of the invention. By leveraging a quantum cloud-based model, the system can handle high transaction volumes without compromising performance. The cloud infrastructure provides the computational power and storage capacity needed to process complex transactions in real time, making the invention suitable for large-scale deployments in industries such as finance, logistics, and telecommunications.

The system's ability to adapt to changing application requirements further enhances its utility. By continuously querying target applications and updating its knowledge of their data structures and attributes, the invention remains dynamic and flexible. This adaptability ensures that the system can accommodate new applications or changes to existing ones without requiring extensive reconfiguration.

Through its unique combination of tokenization, data augmentation, soft commit mechanisms, and advanced anomaly detection, the invention provides a comprehensive solution for managing transaction data in complex multi-application environments. Its ability to simulate and validate data behavior across multiple stages sets it apart from traditional systems, offering a proactive approach to ensuring data integrity and reliability. By addressing the challenges of compatibility, accuracy, and security, the invention delivers significant value to organizations managing intricate transaction workflows.

The invention incorporates several unique features that distinguish it from conventional systems for managing transaction data in multi-application environments. These features work in tandem to create a comprehensive solution for ensuring the accuracy, security, and integrity of transaction data as it moves through complex processing paths. Below are non-limiting examples of unique features of the invention, along with detailed explanations:

a. Quantum Cloud-Based Pre-Training: The invention utilizes a quantum cloud model pre-trained to understand transaction types, paths, and application behaviors. This pre-training enables the system to simulate and predict how transaction data will interact with various applications in real-time. The quantum computing foundation ensures faster processing and supports the complex operations required for analyzing and augmenting data across multiple stages. The pre-training also provides the model with a baseline knowledge of application-specific data requirements, enabling highly accurate simulations.

b. Tokenization of Transaction Data and Metadata: A core feature of the invention is its ability to tokenize both source transaction data and the information gathered from target applications. These tokens encapsulate the data elements and their metadata, creating a uniform representation of data that can be easily processed and analyzed. By converting the transaction data into tokens, the system standardizes the way data is handled, making it possible to perform complex operations like augmentation and validation with high precision.

c. Multi-Level Token Mix-Up Data Augmentation: The invention employs a multi-level token mix-up algorithm to generate augmented data tokens at every stage of the transaction path. Each level corresponds to an application in the processing chain, and the mix-up algorithm combines existing tokens with newly created ones to mimic the expected transformations of the data. This augmentation ensures that the augmented data accurately reflects the requirements and behaviors of each application, making it an invaluable tool for preemptively identifying and resolving potential issues.

d. Soft Commit Mechanism: Unlike traditional systems that perform hard commits, the invention uses a soft commit mechanism to preview augmented data in target applications. Soft commits allow the system to test the behavior of the augmented data without permanently altering the state of the target applications. This non-disruptive approach preserves the integrity of the applications while providing actionable insights into the augmented data's performance. It also minimizes the risks associated with committing erroneous or incompatible data.

e. Real-Time Anomaly Detection Through Preview: The invention detects anomalies in transaction data by analyzing the results of the soft commit process. These anomalies can include missing data elements, structural mismatches, or errors introduced during data transformations. By identifying these issues before the data is fully committed, the system allows for proactive corrections, reducing the need for reprocessing and minimizing delays.

f. TokenMixup Algorithm for Data Quality Enhancement: The use of the TokenMixup algorithm is a unique aspect of the invention. This attention-guided method ensures that augmented data tokens closely resemble real transaction data while maintaining high quality. The algorithm's focus on generating realistic and accurate data representations enhances the system's ability to simulate and validate transactions effectively.

g. Data Lineage Establishment: The system maps the entire lifecycle of transaction data, tracing its transformations, translations, and enhancements as it moves through the processing chain. This data lineage provides a comprehensive view of how data evolves at each stage, enabling the system to predict potential issues and recommend corrective actions.

h. Mapping of Augmented Data Tokens: The invention incorporates advanced mapping techniques to compare augmented data tokens with the original tokens and metadata from the source and target applications. This mapping process ensures the accuracy of the augmented data and highlights discrepancies that could lead to errors. The ability to perform such detailed mapping is a distinguishing feature of the system.

i. Detailed Logging of Soft Commit Process: During the soft commit process, the system generates detailed logs that document how the augmented data interacts with each target application. These logs provide transparency into the data processing workflow, including insights into errors or irregularities that may arise. This logging feature enhances the system's ability to diagnose and resolve issues quickly.

j. Quantum Encryption for Secure Communication: All communications between the source application, quantum model, and target applications are secured using quantum encryption. This ensures that sensitive transaction data remains protected throughout the process, making the system particularly suitable for environments with stringent data security and compliance requirements.

k. Dynamic Adaptability to Application Requirements: The system continuously updates its knowledge of application-specific data structures and attributes by querying target applications in real-time. This dynamic adaptability allows the invention to accommodate changes in application requirements or the addition of new applications without requiring extensive manual reconfiguration.

l. Scalability for High-Volume Transactions: By leveraging a quantum cloud-based infrastructure, the invention can handle large volumes of transactions with minimal latency. This scalability makes the system suitable for industries that process high transaction volumes, such as finance, logistics, and telecommunications.

m. Preservation of Application Characteristics: The soft commit mechanism ensures that the characteristics of target applications remain unchanged during the preview process. This non-intrusive approach prevents disruptions to the normal operations of the applications while allowing the system to validate and refine the augmented data.

n. Insightful Previews for Transaction Behavior: The invention's ability to simulate and preview transaction data behavior provides valuable insights into how data will interact with each application. This capability enables organizations to address issues proactively, reducing operational disruptions and improving overall system efficiency.

o. Comprehensive Error Resolution Framework: By combining anomaly detection, data augmentation, soft commits, and detailed logging, the invention offers a robust framework for resolving errors in transaction data. This integrated approach ensures that errors are identified and corrected at the earliest possible stage, minimizing their impact on downstream processes.

These unique features collectively enable the invention to transform the way transaction data is managed and processed in multi-application environments, ensuring seamless, secure, and efficient operations.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, a method for managing transaction data across a plurality of applications in a multi-application environment includes receiving transaction data and associated metadata from a source application using a quantum cloud-based processing system, where the transaction data comprises a plurality of data elements, and the associated metadata describes attributes of the data elements. The method further includes encrypting the transaction data and associated metadata using an encryption module within the quantum cloud-based processing system, where the encryption employs a dynamically generated quantum encryption key based on the attributes of the transaction data and associated metadata.

The method involves querying each application in a transaction path defined by the transaction data using a querying module within the quantum cloud-based processing system to retrieve data structure requirements and metadata specifications for each application, while establishing secure communication channels with the applications using the quantum encryption key to ensure data security during the querying process. The system establishes a hierarchical map of transformations, translations, and metadata alterations for the transaction data using a data lineage module within the quantum cloud-based processing system, where the hierarchical map is dynamically updated based on responses received from the applications in the transaction path.

The transaction data and associated metadata are tokenized into a plurality of tokens using a tokenization module, where each token represents a data element and its associated metadata and is assigned a unique identifier to enable precise tracking and mapping of data elements through the transaction path. Multi-level token mix-up data augmentation is performed on the tokens using a data augmentation module within the quantum cloud-based processing system to generate augmented tokens, where the augmentation combines existing tokens with newly created tokens based on the data structure requirements and metadata specifications of each application, and the process is weighted to prioritize complex transformations.

The augmented tokens are soft committed to each application in the transaction path using a soft commit module, where the soft commit transmits the augmented tokens to the respective applications in a preview mode without altering their operational characteristics and generates detailed response logs comprising success indicators, error codes, and timing data. The method also includes analyzing responses from the applications using an anomaly detection module within the quantum cloud-based processing system to identify anomalies in the augmented tokens, where the anomalies are categorized based on severity, including critical anomalies that prevent transaction completion and non-critical anomalies that allow partial processing.

Mapping is performed using a mapping module to associate the augmented tokens with the original tokens to identify discrepancies, where a discrepancy report is generated to highlight mismatches and specify the applications where the discrepancies occurred. Logging details of the querying, tokenizing, augmenting, soft committing, anomaly detection, and mapping steps are performed using a logging module, where the logged details include application responses, identified anomalies, and mappings of augmented tokens to original tokens. The method dynamically updates the data structure requirements and metadata specifications for each application in the transaction path using an updating module during the querying process, where the updating incorporates new data attributes or application changes identified during the transaction processing. The logged details, hierarchical map, and augmented tokens are stored in a secure repository using a storage module, where the repository is accessible for review, analysis, and audit purposes.

In some arrangements, the encryption of the transaction data and associated metadata includes generating a unique quantum encryption key for each transaction. This quantum encryption key is dynamically generated based on the attributes of the transaction data and the associated metadata, ensuring that the encryption is tailored to the specific characteristics of each transaction.

In some arrangements, the querying of each application in the transaction path further includes establishing secure communication channels with the respective application using the unique quantum encryption key. These secure communication channels prevent unauthorized access to the transaction data and associated metadata during the querying process, ensuring the integrity and confidentiality of the data.

In some arrangements, the establishment of the data lineage includes creating a hierarchical map of transformations and metadata alterations for each data element. This hierarchical map is dynamically updated based on responses received from the applications in the transaction path, enabling a detailed and real-time traceability of how the transaction data evolves through the system.

In some arrangements, the tokenization of the transaction data and associated metadata includes assigning unique identifiers to each token. These unique identifiers enable precise tracking and mapping of data elements through the transaction path, ensuring consistency and traceability at every stage of processing.

In some arrangements, the multi-level token mix-up data augmentation includes weighting the augmentation process based on the complexity of the transformations and metadata specifications of the applications in the transaction path. This weighting ensures that higher-priority and more complex transformations are augmented with greater accuracy to meet the requirements of the respective applications.

In some arrangements, the soft committing of the augmented tokens to the target applications includes generating detailed response logs for each application. These response logs contain success indicators, error codes, and timing data associated with the preview mode, providing operational insights into how the augmented tokens are processed by each application.

In some arrangements, the analysis of responses from the applications to identify anomalies includes categorizing the anomalies based on their severity. The categorization includes critical anomalies that prevent transaction completion and non-critical anomalies that allow partial processing of the transaction data, enabling prioritized and informed corrective actions.

In some arrangements, the mapping of the augmented tokens to the original tokens includes generating a discrepancy report. This discrepancy report identifies mismatches between the augmented tokens and the original transaction data and specifies the applications where the discrepancies occurred, providing actionable insights for resolving the discrepancies.

In some arrangements, the dynamic updating of the data structure requirements and metadata specifications includes performing real-time updates during the querying process. These real-time updates incorporate new data attributes or changes in application requirements that are identified during the transaction processing, ensuring that the system remains adaptive to evolving application needs.

In some arrangements, a method for managing transaction data across a plurality of applications in a multi-application environment includes receiving transaction data and associated metadata from a source application using a quantum cloud-based processing system, where the transaction data comprises a plurality of data elements and the associated metadata describes attributes of the data elements. The method further includes encrypting the transaction data and associated metadata using an encryption module within the quantum cloud-based processing system, where the encryption employs a dynamically generated quantum encryption key, and the quantum encryption key is based on a combination of transaction data attributes and dynamic environmental variables, such as the time of the transaction and network conditions.

The method involves querying each application in a transaction path using a querying module within the quantum cloud-based processing system, where the querying step retrieves data structure requirements and metadata specifications for each application. The querying module prioritizes applications in the transaction path based on predefined criteria, such as application processing speed, criticality, and historical reliability metrics, while establishing secure communication channels using the quantum encryption key to prevent unauthorized access during the querying process. The system establishes a hierarchical map of transformations, translations, and metadata alterations for the transaction data using a data lineage module, where the hierarchical map is dynamically updated based on responses received from the applications and represents dependencies between data elements as relational links to enhance traceability.

The transaction data and associated metadata are tokenized into a plurality of tokens using a tokenization module, where each token represents a data element and its associated metadata and is assigned a unique identifier that encodes metadata attributes, including data transformations, validations, and compatibility flags. Multi-level token mix-up data augmentation is performed on the tokens using a data augmentation module within the quantum cloud-based processing system to generate augmented tokens, where the augmentation combines existing tokens with newly created tokens based on the data structure requirements and metadata specifications of each application. The augmentation process is further refined using machine learning-based optimization techniques, such as generative adversarial networks, and is weighted to prioritize complex transformations.

The augmented tokens are soft committed to each application in the transaction path using a soft commit module, where the soft commit transmits the augmented tokens to the respective applications in a preview mode without altering their operational characteristics. During this process, the system generates detailed response logs comprising success indicators, error codes, timing data, and resource utilization metrics, including memory usage and processing time for each application. The responses from the applications are analyzed using an anomaly detection module within the quantum cloud-based processing system to identify anomalies in the augmented tokens, where the anomalies are categorized based on severity. The severity categorization includes critical anomalies that prevent transaction completion and non-critical anomalies that allow partial processing, and the system generates an anomaly impact report that quantifies the impact of detected anomalies on transaction processing, including delay estimations and likelihood of failure.

Mapping is performed using a mapping module to associate the augmented tokens with the original tokens to identify discrepancies, where a discrepancy report is generated to highlight mismatches and specify the applications where the discrepancies occurred. Logging details of the querying, tokenizing, augmenting, soft committing, anomaly detection, and mapping steps are performed using a logging module, where the logged details include application responses, identified anomalies, mappings of augmented tokens to original tokens, and operational metrics. The data structure requirements and metadata specifications for each application in the transaction path are dynamically updated using an updating module, where the updating process continuously monitors external changes to application requirements through automated API polling and incorporates such changes into real-time updates during the querying process. The logged details, hierarchical map, and augmented tokens are stored in a secure repository using a storage module, where the repository is accessible for review, analysis, and audit purposes.

In some arrangements, a system for managing transaction data across a plurality of applications in a multi-application environment includes a quantum cloud-based processing system configured to receive transaction data and associated metadata from a source application, where the transaction data comprises a plurality of data elements and the associated metadata describes attributes of the data elements. The system further includes an encryption module within the quantum cloud-based processing system configured to encrypt the transaction data and associated metadata using a dynamically generated quantum encryption key, where the quantum encryption key is generated based on the attributes of the transaction data and the associated metadata.

The system includes a querying module within the quantum cloud-based processing system configured to query each application in a transaction path defined by the transaction data to retrieve data structure requirements and metadata specifications for each application. The querying module establishes secure communication channels with the applications using the quantum encryption key to ensure data security during the querying process. The system also includes a data lineage module configured to establish a hierarchical map of transformations, translations, and metadata alterations for the transaction data, where the hierarchical map is dynamically updated based on responses received from the applications in the transaction path.

The system incorporates a tokenization module configured to tokenize the transaction data and associated metadata into a plurality of tokens, where each token represents a data element and its associated metadata and is assigned a unique identifier to enable precise tracking and mapping of data elements through the transaction path. A data augmentation module within the quantum cloud-based processing system is configured to perform multi-level token mix-up data augmentation on the tokens to generate augmented tokens. The augmentation process combines existing tokens with newly created tokens based on the data structure requirements and metadata specifications of each application, and the process is weighted to prioritize complex transformations.

The system includes a soft commit module configured to soft commit the augmented tokens to each application in the transaction path, where the soft commit transmits the augmented tokens to the respective applications in a preview mode without altering their operational characteristics. The soft commit module generates detailed response logs comprising success indicators, error codes, and timing data associated with the preview mode. An anomaly detection module within the quantum cloud-based processing system is configured to analyze responses from the applications to identify anomalies in the augmented tokens, where the anomalies are categorized based on severity, including critical anomalies that prevent transaction completion and non-critical anomalies that allow partial processing of the transaction data.

The system further includes a mapping module configured to map the augmented tokens to the original tokens to identify discrepancies, where a discrepancy report is generated to highlight mismatches and specify the applications where the discrepancies occurred. A logging module within the quantum cloud-based processing system is configured to log details of the querying, tokenizing, augmenting, soft committing, anomaly detection, and mapping steps, where the logged details include application responses, identified anomalies, and mappings of augmented tokens to original tokens. An updating module within the quantum cloud-based processing system is configured to dynamically update the data structure requirements and metadata specifications for each application in the transaction path during the querying process, incorporating new data attributes or application changes identified during transaction processing. The system includes a storage module configured to store the logged details, hierarchical map, and augmented tokens in a secure repository, where the repository is accessible for review, analysis, and audit purposes.

In some arrangements, the encryption module is further configured to generate the quantum encryption key based on a combination of transaction data attributes and dynamic environmental variables, including the time of the transaction and the network conditions. This dynamic generation ensures that the encryption is highly specific to the context of the transaction, enhancing security and adaptability.

In some arrangements, the querying module is further configured to prioritize applications in the transaction path based on predefined criteria. These criteria include the processing speed of the applications, their criticality within the transaction path, and historical reliability metrics, allowing the system to optimize the order and efficiency of queries.

In some arrangements, the data lineage module is further configured to identify dependencies between data elements in the transaction data. The module represents these dependencies as relational links within the hierarchical map, providing enhanced traceability and enabling deeper insights into how data elements interact and transform throughout the transaction path.

In some arrangements, the tokenization module is further configured to encode metadata attributes within the tokens. These attributes include data transformations, validations, and compatibility flags, ensuring that each token carries detailed information about its associated data element to enable precise processing and tracking.

In some arrangements, the data augmentation module is further configured to apply machine learning-based optimization techniques, such as generative adversarial networks, to refine the multi-level token mix-up process. This optimization improves the accuracy of the augmented tokens, ensuring they closely align with the requirements of the applications in the transaction path.

In some arrangements, the soft commit module is further configured to log resource utilization metrics for each application in the transaction path during the preview mode. These metrics include memory usage and processing time, providing operational insights that can be used to enhance system performance and detect bottlenecks.

In some arrangements, the anomaly detection module is further configured to generate an anomaly impact report. This report quantifies the impact of detected anomalies on transaction processing, including estimations of delays and the likelihood of transaction failure, enabling more informed decisions about corrective actions.

In some arrangements, the updating module is further configured to continuously monitor external changes to application data requirements through automated API polling. These changes are incorporated into real-time updates of the querying process, ensuring that the system remains adaptive to evolving application needs and maintains accurate transaction data processing.

The following description and claims, in conjunction with the drawings-all integral parts of this specification-will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 is an exemplary system architecture diagram in accordance with one or more embodiments disclosed herein that illustrates the components and interactions of a quantum cloud-based processing system for managing transaction data across a multi-application environment. The diagram includes modules for encryption, querying, tokenization, data augmentation, anomaly detection, and dynamic updating, as well as the secure repository and infrastructure enabling efficient and secure data processing.

FIG. 2 is an exemplary flow diagram in accordance with one or more embodiments disclosed herein that illustrates the step-by-step process for managing transaction data across a multi-application environment using a quantum cloud-based processing system. The diagram details key operations, including data encryption, querying, tokenization, augmentation, anomaly detection, and secure storage, to ensure efficient, secure, and adaptive transaction data processing.

FIG. 3 is an exemplary sequence diagram in accordance with one or more embodiments disclosed herein that illustrates the interactions and processes between the source application, quantum cloud-based processing system, and various modules involved in managing transaction data across a multi-application environment. The diagram details key sequences, including data encryption, querying, tokenization, augmentation, anomaly detection, and secure storage, to ensure accurate and efficient transaction processing.

FIG. 4 is an exemplary class diagram in accordance with one or more embodiments disclosed herein that illustrates the structural relationships and interactions between key components and modules of the quantum cloud-based processing system for managing transaction data. The diagram details classes, their attributes and methods, and the interconnections between encryption, querying, tokenization, augmentation, anomaly detection, and storage components to enable efficient and secure data processing.

FIG. 5 is an exemplary solution diagram in accordance with one or more embodiments disclosed herein that illustrates the step-by-step processes of a quantum cloud-based system for managing transaction data across multi-application environments. The diagram details the pre-training of a quantum model, secure integration with source applications, data lineage mapping, tokenization, multi-level token mix-up data augmentation, and soft commit processes to ensure secure, efficient, and adaptable transaction workflows.

DETAILED DESCRIPTION

The invention is a system and method for managing transaction data as it traverses multiple applications in a complex multi-application environment. It leverages a quantum cloud-based processing system to handle the intricacies of transforming, validating, and augmenting transaction data while ensuring security, adaptability, and efficiency. By pre-training the quantum model with knowledge of transaction types, paths, and application-specific requirements, the invention ensures that the system can accurately simulate and predict how data behaves at each stage of its processing path.

The process begins with receiving transaction data and its associated metadata from a source application. The transaction data comprises multiple elements, each accompanied by metadata that describes its attributes. This data is then encrypted using quantum encryption techniques to ensure secure communication throughout the processing. The encryption mechanism dynamically generates a quantum encryption key for each transaction, which is based on the attributes of the data and contextual environmental variables, such as the time and network conditions.

The system uses a querying module to interact with each application in the transaction path. This module retrieves the data structure requirements and metadata specifications for each application, ensuring that the system is aware of how the transaction data will be processed at each stage. The querying module establishes secure communication channels with each application using the quantum encryption key, protecting the data from unauthorized access during this process. The system also prioritizes applications based on predefined criteria, such as processing speed, criticality, and reliability, to optimize the order and efficiency of queries.

A data lineage module creates a hierarchical map of the transformations, translations, and metadata alterations that the transaction data undergoes as it moves through the transaction path. This map includes relational links that represent dependencies between data elements, enhancing traceability and providing a detailed view of how data evolves through the system. The hierarchical map is dynamically updated based on responses from the queried applications, ensuring that it reflects the most current data requirements and transformations.

The transaction data and associated metadata are tokenized into a set of standardized tokens. Each token encapsulates a data element and its associated metadata, including encoded attributes such as transformations, validations, and compatibility flags. These tokens are assigned unique identifiers, enabling precise tracking and mapping of data elements throughout the processing path. The tokenization process creates a uniform data structure that simplifies further operations, such as augmentation and validation.

To prepare the data for application-specific requirements, the system employs multi-level token mix-up data augmentation. This process generates augmented tokens by combining existing tokens with newly created ones, guided by the data structure requirements and metadata specifications of each application. The augmentation process is weighted to prioritize complex transformations, ensuring that the augmented tokens meet the specific needs of the applications in the transaction path. Advanced optimization techniques, such as generative adversarial networks, are applied to refine the augmentation process and improve the accuracy of the augmented tokens.

The system performs a soft commit of the augmented tokens to each application in the transaction path. This involves transmitting the augmented tokens to the respective applications in a preview mode, which does not alter their operational characteristics. The soft commit mechanism generates detailed response logs that include success indicators, error codes, timing data, and resource utilization metrics such as memory usage and processing time. This non-intrusive approach allows the system to evaluate how the augmented tokens interact with each application without disrupting normal operations.

An anomaly detection module analyzes the responses from the applications to identify any issues with the augmented tokens. The anomalies are categorized based on their severity, distinguishing between critical anomalies that prevent transaction completion and non-critical anomalies that allow partial processing. The system generates an anomaly impact report, which quantifies the impact of detected anomalies on transaction processing, including estimations of delays and the likelihood of transaction failure. This analysis provides valuable insights for addressing the identified anomalies.

The system maps the augmented tokens back to the original tokens to identify discrepancies. A mapping module generates a discrepancy report that highlights mismatches between the augmented tokens and the original transaction data, specifying the applications where the discrepancies occurred. This mapping process ensures that any issues in the augmented data are accurately identified and localized, enabling targeted corrective actions.

A logging module captures details of the entire processing workflow, including the steps of querying, tokenizing, augmenting, soft committing, anomaly detection, and mapping. The logged details include application responses, identified anomalies, mappings of augmented tokens to original tokens, and operational metrics. These logs are stored in a secure repository, providing a comprehensive audit trail for review, analysis, and compliance purposes.

To maintain adaptability, the system dynamically updates its knowledge of application-specific data requirements and metadata specifications. An updating module continuously monitors external changes to these requirements through automated API polling and incorporates the changes into real-time updates of the querying process. This ensures that the system remains current with evolving application needs and maintains accurate processing capabilities.

The storage module stores all logged details, the hierarchical map, and the augmented tokens in a secure repository. This repository is designed to be accessible for review and analysis, allowing administrators to audit the transaction workflows and address any identified issues effectively. The secure storage of these artifacts ensures that the system retains a reliable record of all processing activities.

The invention is designed to scale efficiently, leveraging the computational power of a quantum cloud infrastructure to handle high transaction volumes. The system dynamically allocates resources based on workload demands, ensuring optimal performance even in environments with fluctuating transaction loads. This scalability makes the invention suitable for deployment in industries that process large volumes of data, such as finance, logistics, and telecommunications.

By integrating secure, adaptive, and efficient processing steps, the invention addresses the challenges of managing transaction data across complex multi-application environments. Its ability to proactively detect anomalies, dynamically adapt to changes, and provide detailed insights into the transaction workflow ensures seamless and reliable data processing. This comprehensive approach sets the invention apart as a robust solution for managing modern transaction data requirements.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

In various configurations, terms such as "computers" and "machines" refer to devices that may be general-purpose or specialized for specific tasks, whether physical or virtual, and capable of network connectivity. These devices encompass all necessary hardware, software, and components known to skilled practitioners, including application-specific integrated circuits (ASICs), microprocessors, cores, or other processing units. These components execute, control, or implement various types of software, instructions, data, modules, processes, or routines. The terms used do not restrict the device type and should be broadly interpreted. Software, data, and executable code can reside on various physical, computer-readable storage devices, such as local memory, cloud-based storage, or network-attached storage. These can be stored in both volatile and non-volatile memory and may function autonomously or respond to specific triggers. These elements can be consolidated or distributed across multiple devices and stored in accessible memory systems such as distributed databases, big data infrastructures, blockchains, or distributed ledgers.

Networks and similar references refer to a broad range of communication systems, from local area networks (LANs) and wide area networks (WANs) to the Internet and cloud-based networks, supporting wired and wireless configurations. Specialized networks like digital subscriber line (DSL), frame relay, asynchronous transfer mode (ATM), and virtual private networks (VPN) are included. These networks utilize various hardware and software components, including modems, routers, firewalls, switches, and adapters, to facilitate communication. Networks are also equipped with virtual IP addresses and support multiple protocols like HTTPS, enabling effective packet-based data transmission and communication.

Generative Artificial Intelligence (AI) refers to AI techniques that learn from training data and generate new content, such as text, code, images, and audio. Generative AI systems, often powered by large language models (LLMs) like GPT-3, GPT-4, Meta LLaMA, and others, can be deployed through APIs, search engines, or chatbots. These models, which may be proprietary or open source, leverage deep learning methods and are generally governed by enterprise policies regarding AI and risk. Models such as BERT, T5, AlphaFold, Watson, Megatron, and others play a role in generating or interpreting language and content for various applications.

Generative AI and LLMs are utilized throughout this disclosure for tasks including natural language processing, data analysis, real-time processing, software development, and creative content generation. Specific functions include trend analysis, data classification, sentiment analysis, writing assistance, language translation, and decision-making support. These models enable capabilities like feedback learning, context determination, and comprehensive search operations, improving performance through iterative learning and feedback from human or system interactions. The wide range of applications supported by generative AI makes these systems a powerful tool in generating, analyzing, and managing information across diverse fields. All configurations and uses of these models are within the scope of this disclosure.

FIG. 1 is an exemplary system architecture diagram in accordance with one or more embodiments disclosed herein, providing a detailed illustration of a quantum cloud-based processing system for managing transaction data across a complex multi-application environment. At the heart of the system is the quantum cloud-based processing system (100), which orchestrates secure, efficient, and adaptive workflows. This system handles transaction data that flows from a source application (102), initiating the process by receiving transaction data and its associated metadata. The transaction data consists of a plurality of data elements, each described by metadata attributes such as data type, size, and intended use within subsequent applications in the transaction path. The receipt of this data initiates a series of interconnected processes designed to ensure data integrity, accuracy, and security.

Once the transaction data and metadata are received, the system forwards them to the encryption module (104). This module encrypts the data using advanced quantum encryption techniques to protect the transaction data as it flows through the system. The encryption process is enhanced by the quantum encryption key generator (106), which dynamically generates a unique quantum encryption key for each transaction. This key is derived based on the attributes of the transaction data, such as its structure and sensitivity, as well as dynamic environmental variables, including the time of the transaction and network conditions. This dynamic approach ensures that each transaction is encrypted with a highly specific and robust key, minimizing the risk of unauthorized access.

The encrypted transaction data is then processed by the querying module (108), which communicates with applications in the transaction path (142) to retrieve data structure requirements and metadata specifications. These specifications define how each application processes and interacts with the transaction data. To ensure secure communication during this step, the querying module employs a secure communication channel establishment module (110). This module uses the quantum encryption key to create secure channels between the system and each application, preventing any interception or tampering during the exchange of sensitive information. Furthermore, the querying module includes a data prioritization module (112), which optimizes the order in which applications are queried. The prioritization is based on criteria such as processing speed, application criticality, and historical reliability metrics, enabling the system to maximize efficiency and meet time-sensitive requirements.

The data lineage module (114) plays a critical role in the architecture by creating and maintaining a hierarchical map of the transformations, translations, and metadata alterations that occur as the transaction data moves through the system. This map provides a detailed trace of the data's evolution, highlighting how each application modifies or enhances the data elements. The hierarchical map is dynamically updated in real time based on the responses received from applications during the querying process. Additionally, this module identifies dependencies between data elements, representing them as relational links within the map. These relational links enhance traceability, allowing administrators and the system itself to understand and adapt to how data elements interact and transform in complex workflows.

The tokenization module (116) is responsible for converting the transaction data and metadata into a set of standardized tokens. Each token encapsulates a single data element along with its associated metadata, creating a uniform structure that simplifies further processing. The tokens are assigned unique identifiers, ensuring that they can be precisely tracked and mapped throughout the transaction path. Additionally, the metadata encoding component (118) within the tokenization module encodes important metadata attributes, such as data transformations, validations, and compatibility flags, into the tokens. This encoding ensures that each token carries all the information required for accurate processing, even as it undergoes multiple stages of transformation.

To ensure that the tokens meet the specific requirements of each application in the transaction path, the system employs the data augmentation module (120). This module performs multi-level token mix-up data augmentation, generating augmented tokens by combining existing tokens with newly created ones. The augmentation process is guided by the data structure requirements and metadata specifications retrieved during the querying step. Within the data augmentation module, the machine learning optimization component (122) applies advanced techniques, such as generative adversarial networks, to refine the augmentation process. These optimizations enhance the accuracy of the augmented tokens, ensuring that they align closely with the expectations of each application.

The augmented tokens are then passed to the soft commit module (124), which performs a preview operation by transmitting the tokens to the applications in the transaction path without making permanent changes to their operational characteristics. This preview mode allows the system to evaluate how each application interacts with the augmented tokens. The soft commit module generates detailed response logs (126), capturing metrics such as success indicators, error codes, processing times, and resource utilization. These logs provide valuable insights into the performance of the augmented tokens and the behavior of the applications.

The anomaly detection module (128) analyzes the responses collected during the soft commit phase to identify any anomalies in the augmented tokens. Anomalies may include structural mismatches, missing data elements, or deviations from the expected behavior. The module categorizes these anomalies based on their severity, distinguishing between critical anomalies that prevent the transaction from being completed and non-critical anomalies that allow partial processing. The anomaly impact reporting component (130) generates detailed reports that quantify the impact of the identified anomalies, including their potential to delay processing or cause transaction failure. These reports provide actionable insights for resolving issues.

The mapping module (132) compares the augmented tokens to the original tokens, identifying discrepancies and generating a discrepancy report. This report specifies mismatches between the augmented tokens and the original transaction data and highlights the applications where these discrepancies occurred. This mapping process ensures that issues in the augmented data are accurately identified and localized, enabling targeted corrections.

The logging module (134) captures comprehensive details of the entire processing workflow. These logs include data and metadata transformations, application responses, anomalies, mappings, and operational metrics. The system stores these logs in the secure repository (140) using the storage module (138), ensuring that all data is securely retained for auditing, review, and analysis. The repository allows authorized personnel to access transaction histories, supporting transparency and compliance.

To maintain adaptability, the updating module (136) dynamically updates the data structure requirements and metadata specifications for the applications in the transaction path. The module continuously monitors external changes through automated API polling and incorporates these updates into the querying process, ensuring that the system remains aligned with evolving application requirements.

The architecture is supported by the quantum cloud infrastructure (148), which provides the computational resources needed to process large transaction volumes efficiently. This infrastructure dynamically allocates resources based on workload demands, ensuring scalability and consistent performance under varying conditions. Overall, the system integrates secure, efficient, and adaptive processes to manage transaction data across complex multi-application environments, ensuring accuracy, reliability, and security throughout the workflow.

FIG. 2 is an exemplary flow diagram in accordance with one or more embodiments disclosed herein, illustrating in meticulous detail the step-by-step process by which a quantum cloud-based processing system manages transaction data across a multi-application environment. The flow begins with the initialization of the quantum cloud-based processing system, preparing it to handle incoming transaction data securely, efficiently, and in a manner that ensures compliance with the requirements of various applications in the transaction path. This initialization process establishes all necessary computational resources, establishes communication pathways with dependent modules, and ensures the readiness of all subsystems for data processing (200).

The first operational step involves receiving transaction data and associated metadata from a source application (202). The transaction data comprises multiple discrete data elements, each accompanied by metadata that defines its attributes, including format, size, type, and its expected use in downstream processing. This metadata provides a foundation for understanding the data's behavior and interactions within the system. Upon receiving this information, the system ensures it is appropriately cataloged and prepared for subsequent encryption.

The encryption process is a critical step, carried out by the encryption module. Here, the transaction data and metadata are encrypted using a dynamically generated quantum encryption key, ensuring the security and confidentiality of the information as it moves through the system (204). The encryption key is created by the quantum encryption key generator, which derives a unique key based on the specific attributes of the transaction data and dynamic environmental variables, such as the time of the transaction and current network conditions. This dynamic generation ensures that each transaction has a unique encryption profile, adding an additional layer of security to protect against unauthorized access or interception.

With the data encrypted, the system transitions to the querying phase. The querying module retrieves data structure requirements and metadata specifications from each application in the transaction path (206). To ensure that sensitive information is transmitted securely, the querying module employs secure communication channels, which are established using the previously generated quantum encryption key (208). These channels prevent unauthorized access during the exchange of application-specific requirements, ensuring the integrity and confidentiality of the interaction. The querying module further optimizes its process by prioritizing the applications it queries, using criteria such as the criticality of the application, its historical reliability, and its processing speed (210). This prioritization ensures that the most crucial applications are handled first, reducing the likelihood of bottlenecks or delays in the transaction workflow.

Once the querying process is complete, the system leverages the data lineage module to create a hierarchical map of the transaction data's journey through the multi-application environment (212). This map records every transformation, translation, and metadata alteration that occurs as the data progresses through the system. The hierarchical map is dynamically updated based on responses from the applications, providing real-time insights into the data's evolution. It also identifies dependencies between data elements, representing them as relational links that enhance the traceability of the data's flow. This level of detail enables the system to adapt to complex workflows and ensure that every transformation is accurately accounted for.

The next stage involves tokenizing the transaction data and metadata into a set of standardized tokens (214). Each token encapsulates a specific data element and its associated metadata, providing a uniform structure for subsequent processing. The tokenization module assigns unique identifiers to each token, ensuring precise tracking and mapping throughout the transaction path. Furthermore, metadata attributes, such as data transformations, validations, and compatibility flags, are encoded into the tokens, allowing the system to carry forward all necessary information for downstream processing (216).

Following tokenization, the data augmentation module performs multi-level token mix-up data augmentation (218). This process generates augmented tokens by combining existing tokens with newly created ones, guided by the data structure requirements and metadata specifications retrieved earlier. The augmentation process is further refined by applying advanced optimization techniques, such as generative adversarial networks, to ensure the accuracy and relevance of the augmented tokens (220). These optimizations are critical for meeting the diverse and specific requirements of the applications in the transaction path.

The augmented tokens are then transmitted to the applications in the transaction path using the soft commit module (222). This transmission occurs in a preview mode, ensuring that the operational characteristics of the applications are not altered during the process. The soft commit module generates detailed response logs, capturing success indicators, error codes, processing times, and resource utilization metrics, such as memory usage and processing load, for each application (224). These logs provide valuable insights into how the augmented tokens are processed and highlight any potential issues.

The system then analyzes the responses from the applications using the anomaly detection module (226). This analysis identifies anomalies in the augmented tokens, such as structural mismatches, missing data elements, or deviations from expected behavior. The anomalies are categorized based on their severity, with critical anomalies identified as those preventing the transaction's completion and non-critical anomalies classified as those that allow partial processing (228). To provide actionable insights, the anomaly detection module generates an anomaly impact report (230). This report quantifies the impact of the anomalies on transaction processing, including potential delays, likelihood of failure, and the extent to which the anomalies might affect downstream applications.

The mapping module ensures consistency by comparing the augmented tokens to the original tokens, identifying any discrepancies between them (232). This process generates a discrepancy report that specifies mismatches and pinpoints the applications where these discrepancies occurred. By isolating these issues, the mapping module facilitates targeted corrections and ensures that the data integrity is preserved throughout the system.

The logging module captures comprehensive details of the entire workflow, recording every step from querying to mapping (234). These logs include operational metrics, application responses, identified anomalies, and the mappings between augmented and original tokens. This robust logging capability ensures a complete audit trail for compliance, review, and analysis. The system further maintains adaptability through the updating module, which dynamically updates the data structure requirements and metadata specifications of the applications in real-time (236). This module monitors external changes via automated API polling and integrates these updates into the querying process, ensuring that the system remains aligned with evolving application needs.

The final step involves storing all logged details, hierarchical maps, and augmented tokens in a secure repository using the storage module (238). The repository ensures that all data is securely retained and accessible for future review, analysis, and auditing. With the successful storage of data, the process concludes, leaving the system prepared for subsequent transactions (240). This flow diagram represents a meticulously integrated series of steps that collectively provide a secure, adaptive, and efficient framework for managing transaction data across complex multi-application environments.

FIG. 3 is an exemplary sequence diagram that illustrates the detailed interactions and processes involved in managing transaction data within a quantum cloud-based processing system. The sequence begins when the source application initiates the process by transmitting transaction data and its associated metadata to the quantum cloud-based processing system. This transaction data consists of multiple discrete data elements, each accompanied by metadata attributes, including the type, format, size, and intended usage of the data. The metadata is crucial for ensuring that the data elements are correctly processed by the downstream applications, as it provides contextual information required for transformations and compatibility checks. The receipt of this transaction data triggers the system to prepare the information for secure handling and further processing (300).

After receiving the transaction data, the quantum cloud-based processing system forwards it to the encryption module for secure encoding (302). The encryption module utilizes a dynamically generated quantum encryption key to encrypt both the transaction data and metadata. This key is created by the quantum encryption key generator, which derives a unique key for each transaction based on attributes of the data, such as its structural properties, sensitivity, and dynamic environmental variables, including the transaction's timestamp and current network conditions. This approach ensures that each transaction has a highly specific encryption profile, enhancing security and protecting the data from unauthorized access or tampering. Once the encryption process is completed, the encrypted data is prepared for interaction with downstream components (304).

The encrypted data is then processed by the querying module, which begins by communicating with each application in the transaction path to retrieve their data structure requirements and metadata specifications (306). The querying module establishes secure communication channels with each application using the encryption key, ensuring that sensitive transaction data remains protected during the exchange of information (308). These secure channels are essential to maintain data integrity and confidentiality throughout the querying process. To further optimize the querying process, the module prioritizes applications based on a set of predefined criteria, including the criticality of the application, its historical reliability metrics, and its processing speed (310). This prioritization ensures that critical applications are queried first, reducing delays and maximizing system efficiency.

The querying process generates responses from the applications that are sent back to the quantum cloud-based processing system. These responses are utilized by the data lineage module to create a hierarchical map of the transaction data's flow and transformation (312). The hierarchical map captures all transformations, translations, and metadata alterations the data undergoes during processing. This map is dynamically updated as new responses are received from the applications, ensuring that it reflects the most current state of the data. The map also identifies dependencies between data elements, representing them as relational links. These links provide valuable insights into how individual data elements interact and evolve within the system, enabling the system to adapt to complex workflows dynamically.

The tokenization module then processes the transaction data and metadata to convert them into a set of standardized tokens (314). Each token encapsulates a specific data element and its associated metadata, ensuring uniformity in representation. The tokens are assigned unique identifiers, enabling precise tracking of each data element as it moves through the transaction path. Furthermore, the tokenization module encodes metadata attributes into the tokens, such as information about data transformations, validations, and compatibility flags. This encoding ensures that each token carries all necessary information for downstream processing and verification (316).

With the tokens prepared, the data augmentation module performs multi-level token mix-up data augmentation to generate augmented tokens (318). This augmentation process combines existing tokens with newly created ones based on the data structure requirements and metadata specifications retrieved from the applications. The augmentation process is further refined using advanced optimization techniques, such as generative adversarial networks, which ensure that the augmented tokens closely align with the specific requirements of the applications in the transaction path (320). These optimizations are vital for maintaining the accuracy and consistency of the transaction data as it undergoes transformations.

The augmented tokens are transmitted to the applications in the transaction path using the soft commit module (322). This transmission occurs in a preview mode, allowing the system to observe how each application processes the tokens without permanently altering the application's state or operational characteristics. The applications respond with detailed feedback, including success indicators, error codes, processing times, and resource utilization metrics such as memory usage. These responses are logged by the soft commit module and made available for further analysis (324).

The system uses the anomaly detection module to analyze the responses from the applications, identifying any anomalies in the augmented tokens (326). These anomalies may include missing data elements, structural mismatches, or deviations from expected behavior. The module categorizes the anomalies based on their severity, distinguishing between critical anomalies that prevent the transaction from being completed and non-critical anomalies that allow partial processing (328). The module also generates an anomaly impact report, quantifying the impact of the anomalies on transaction processing, including potential delays and probabilities of failure (330).

To ensure consistency and accuracy, the mapping module compares the augmented tokens to the original tokens, identifying any discrepancies between them (332). This process generates a discrepancy report that specifies mismatches and highlights the applications where these discrepancies occurred. By isolating these issues, the mapping module facilitates targeted corrections and ensures the integrity of the transaction data throughout the system (334).

The quantum cloud-based processing system invokes the logging module to capture all details of the workflow (336). This logging includes comprehensive records of every step, such as querying, tokenizing, augmenting, soft committing, anomaly detection, and mapping. The logs provide a detailed audit trail, ensuring compliance with regulatory requirements and enabling future review and analysis. These logs are stored securely in the repository through the storage module, ensuring that all data is retained for auditing and further insights (338).

To maintain adaptability, the updating module continuously monitors changes in application data requirements through automated API polling (340). This module dynamically updates the querying process, ensuring that the system remains aligned with evolving application needs and requirements. Finally, the storage module securely stores all processed data, including logs, hierarchical maps, and augmented tokens, in the secure repository, completing the transaction management workflow (342). FIG. 3 showcases the intricate interactions and flows between the various components and modules, demonstrating the system's ability to manage transaction data securely, adaptively, and efficiently within complex multi-application environments.

FIG. 4 is an exemplary class diagram that provides a comprehensive view of the structure, attributes, methods, and relationships between the various components that make up the quantum cloud-based processing system for managing transaction data across a multi-application environment. At the core of this architecture is the quantum cloud-based processing system (400), which orchestrates all processes from data intake to secure storage. This central class is designed with attributes that enable it to manage critical transaction operations, including 'transactionData', which holds the raw data received from the source application, and 'metadata', which provides descriptive information about the data elements such as format, type, and dependencies. The 'encryptionKey' attribute ensures secure processing by storing the dynamically generated quantum encryption key used during encryption. The 'hierarchicalMap' attribute tracks the transformations and dependencies of the transaction data as it moves through the system, while 'tokenRepository' serves as a storage area for tokens generated during the tokenization process. Additionally, the 'anomalyReport' attribute contains a detailed record of detected anomalies for analysis and resolution. Key methods in this class include 'receiveTransaction(data, metadata)', which initializes the workflow, 'processTransaction( )', which coordinates the sequence of operations, and 'storeResults( )', which archives the final outputs.

The source application (402) represents the external entity that provides the transaction data and metadata to the system. This class interacts directly with the quantum cloud-based processing system by invoking its 'sendTransaction( )' method to deliver data securely. Upon receipt, the data flows to the encryption module (404), a critical class responsible for securing sensitive information. The encryption module generates a unique quantum encryption key through its 'generateEncryptionKey(dataAttributes)' method, which dynamically calculates the key based on transaction-specific attributes such as data sensitivity and environmental factors, including transaction time and network conditions. The 'encryptData(data, metadata)' method utilizes this key to encode the transaction data and metadata, ensuring that they are securely protected before further processing.

The querying module (406) is a specialized class tasked with gathering data structure requirements and metadata specifications from each application in the transaction path. Its attributes include 'applications', which lists all applications to be queried, and 'secureChannels', which maintains secure communication pathways established during interactions. This module ensures that every application's requirements are understood through its 'queryApplications(transactionPath)' method, while 'establishSecureChannels( )' uses the encryption key to create secure connections for data exchange. To optimize the workflow, the 'prioritizeApplications(criteria)' method organizes the applications based on their criticality, reliability, and processing speed, ensuring efficient processing of the transaction.

The data lineage module (408) plays a central role in tracking the evolution of transaction data. Through its 'hierarchicalMap' attribute, it records all transformations, translations, and metadata modifications applied to the data. This attribute is dynamically updated in real-time to reflect the most current state of the data. The 'createDataLineage(data)' method initializes this map, while 'updateDataLineage(applicationResponses)' incorporates information received from queried applications, providing a comprehensive view of the data's journey and dependencies.

The tokenization module (410) transforms transaction data into standardized tokens that are easier to manage and track. The 'tokens' attribute holds these representations, while the 'tokenizeData(data, metadata)' method performs the conversion. Each token is assigned a unique identifier using the 'assignUniqueIdentifiers(tokens)' method to ensure traceability throughout the workflow. The 'encodeMetadata(tokens, metadataAttributes)' method embeds vital attributes such as data transformations, validations, and compatibility flags into the tokens, making them self-contained units for downstream processing.

The data augmentation module (412) enhances the tokens by performing multi-level token mix-up data augmentation. This class includes the 'augmentedTokens' attribute to store the refined tokens generated by the 'performAugmentation (tokens, appRequirements)' method. Optimization techniques, such as generative adversarial networks, are applied through the 'optimizeAugmentation(augmentationModel)' method to ensure that the augmented tokens align precisely with the requirements of downstream applications.

The soft commit module (414) ensures non-intrusive interaction with applications by transmitting augmented tokens in preview mode. The 'applicationResponses' attribute stores feedback from these interactions, and the 'commitTokens(tokens, applications)' method handles the token submission process. Responses are logged through the 'logResponses(responses)' method, providing valuable insights into application behavior and token compatibility.

The anomaly detection module (416) identifies, categorizes, and reports issues detected in the augmented tokens. The 'anomalies' attribute lists these detected issues, while the 'detectAnomalies(responses)' method identifies discrepancies. The 'categorizeAnomalies(anomalies)' method organizes these issues based on severity, distinguishing between critical and non-critical anomalies. The 'generateAnomalyReport( )' method compiles these findings into a comprehensive document that quantifies the impact of the anomalies on transaction workflows.

The mapping module (418) ensures consistency by comparing augmented tokens to their original counterparts. The 'discrepancies' attribute captures mismatches, and the 'mapTokens(originalTokens, augmentedTokens)' method performs the comparison. This process is documented in a discrepancy report generated by the 'generateDiscrepancyReport( )' method, providing actionable insights for corrective measures.

The logging module (420) records all workflow details, including operational metrics and system interactions. Its 'logEntries' attribute holds these records, while the 'logWorkflowDetails(details)' method ensures that every process step is documented. The 'retrieveLogs( )' method allows access to these records for review, compliance, and analysis.

The updating module (422) dynamically adjusts the system's understanding of application requirements based on real-time monitoring. Its 'applicationUpdates' attribute tracks these changes, while the 'monitorApplicationChanges( )' method continuously polls applications for updates. These changes are incorporated into the system through the 'updateApplicationSpecifications( )' method, ensuring that the workflow remains adaptive.

The storage module (424) and secure repository (426) classes are responsible for archiving and retrieving transaction data, logs, and other artifacts. The storage module's 'repository' attribute points to the secure repository, while its 'storeData(data)' method ensures that all critical information is securely retained. The secure repository's 'storedData' attribute holds this information, and its 'retrieveData (query)' method facilitates access when needed.

Applications in the transaction path are represented by the application (428) class, which includes attributes such as 'name' and 'dataRequirements'. This class interacts with the system through methods like 'respondToQuery(query)' and'processSoftCommit(tokens)'. The token (430) class defines the structure of tokens, with attributes such as 'id', 'dataElement', and 'metadata'. Its 'updateMetadata(attributes)' method dynamically embeds updated information into the tokens.

Finally, the anomaly (432) class defines detected issues, with attributes such as 'description', 'severity', and 'application'. The 'classifySeverity( )' method organizes anomalies, ensuring they are addressed appropriately. FIG. 4 demonstrates the comprehensive design and interrelationships of the classes, showcasing how the system's components work together to securely, adaptively, and efficiently manage transaction data across a multi-application environment.

FIG. 5 is a detailed solution diagram that describes the intricate processes of a quantum cloud-based system designed for managing transaction data securely, efficiently, and with adaptability to complex workflows. The diagram begins with step 500, pre-train the quantum model, a crucial foundational step in the system's operation. In this step, the quantum computing model, implemented in Python and hosted on a quantum cloud infrastructure, is pre-trained with extensive knowledge about transaction types, transaction paths, and the specific applications involved in processing transactions. This pre-training equips the model with a deep understanding of the data flow, participant applications, and the unique characteristics of each transaction type. The quantum computing platform is optimized for faster processing, enabling it to handle the high-speed computations required for managing complex, multi-application workflows while ensuring seamless integration with transaction environments.

Once the model is pre-trained, the system proceeds to step 502, integrate with quantum model, which involves the use of a secure, quantum-encrypted API. This step ensures that all communication between the source application and the quantum model is fully protected against unauthorized access. During this step, the source application transmits critical information, including transaction type, transaction path, transaction data, and metadata, to the quantum model. The quantum encryption mechanism guarantees the confidentiality and integrity of the data, ensuring that sensitive transaction information remains secure throughout the process. By leveraging this integration, the quantum model gains access to all necessary parameters to initiate processing and execute downstream operations efficiently.

The system then moves to step 504, establish the data structure at each app in the transaction path with metadata, where the quantum model queries all target applications in real time to retrieve their data structure requirements and associated metadata. The metadata provides essential insights into the behavior of data within each application, including attributes such as data type, size, format, and required transformations. This step enables the model to build a comprehensive understanding of how data elements exist and function across the transaction path. The model uses this information to map the attributes of each data element, ensuring that all data flows correctly and is compatible with the requirements of downstream applications.

Next, in step 506, establish the data lineage, the model delves deeper into the lifecycle of the data by querying the applications further to gather information on data structure enhancements, translations, and transformations. Using this information, the model constructs a detailed data lineage map that tracks the transaction data's journey across the system. This lineage captures how data elements evolve as they pass through various stages of processing and transformation. The data lineage serves as a critical tool for traceability, allowing the system to identify and document the origins, changes, and interactions of each data element. This traceability is vital for compliance purposes, auditing, and troubleshooting, ensuring that any issues in the data flow can be accurately identified and resolved.

In step 508, tokenization, the quantum model processes all information about the transaction data, including source and target data structures, and converts this information into standardized tokens. Each token encapsulates a specific data element and its metadata, providing a uniform representation that simplifies further processing. These tokens are designed to maintain the integrity of the data and ensure that all attributes and metadata are carried forward accurately. Tokenization enhances traceability by creating a structured framework that allows for precise tracking of data elements across the transaction path.

The quantum model then performs step 510, multi-level token mix-up data augmentation, a critical phase in which the system uses the previously generated tokens to create augmented tokens by combining existing tokens or blending them with newly generated tokens. The augmentation process occurs at multiple levels, where each level corresponds to an application in the transaction path. The model mimics the data transformations that occur at each application, extracting metadata and tokenizing it at every stage. This process ensures that the augmented tokens accurately represent the data's behavior and characteristics as it flows through the transaction path. The use of generative models and advanced machine learning techniques enhances the accuracy and consistency of the augmented tokens, aligning them with the specific requirements of each application. The purpose of this multi-level token mix-up data augmentation is to generate highly precise representations of the transaction data, ensuring compatibility and seamless integration with downstream systems.

Finally, in step 512, mapping and soft commit, the system maps the augmented tokens to their respective target application tokens based on their metadata. During this step, the quantum model performs a soft commit, where it previews the transaction data on each application without permanently altering the application's operational characteristics. This soft commit allows the system to observe how each application interacts with the augmented tokens, identifying potential anomalies such as missing data elements, incorrect attributes, or mismatched transformations. These anomalies may arise from issues at the source application, discrepancies within the target applications, or errors in the data transformation process. The system records all anomalies, categorizing them by type and severity to facilitate targeted corrective actions.

Overall, FIG. 5 presents a comprehensive view of a sophisticated quantum cloud-based system for transaction data management. The pre-trained quantum model, secure integration mechanisms, detailed data lineage mapping, tokenization, multi-level data augmentation, and soft commit processes all work together to create a seamless, efficient, and secure data management framework. This system addresses the challenges of handling sensitive transaction data in complex workflows, ensuring data integrity, traceability, and adaptability while leveraging the computational power of quantum technology for faster and more accurate processing.

Pseudocode exemplars for implementing various aspects of this disclosure are set forth below with explanations for reference.

```
# Step 1: Pre-train the Quantum Model
def pre_train_model(transaction_dataset):
  """
  Pre-trains the quantum cloud-based model with transaction types,
  paths, and application-specific data requirements.
  """
  quantum_model = initialize_quantum_model( )
  for transaction in transaction_dataset:
      path = transaction["path"]
      for app in path:
          quantum_model.update_weights(app["data_requirements"])
  return quantum_model
# Step 2: Receive Transaction and Encrypt
def receive_transaction(transaction_data, metadata):
  """
     Receives transaction data and encrypts it using quantum
encryption.
  """
  encrypted_data = quantum_encrypt(transaction_data, metadata)
  return encrypted_data
# Step 3: Query Target Applications
def query_target_apps(transaction_path):
  """
  Queries all applications in the transaction path to gather data structures
  and metadata for each application.
  """
  data_lineage = { }
  for app in transaction_path:
      response = api_call(app["query_url"], app["params"])
      data_lineage[app["name"]] = response["data_structure"]
  return data_lineage
# Step 4: Tokenize Data
def tokenize_data(source_data, metadata):
  """
  Converts source transaction data and metadata into tokens.
  """
  tokens = [ ]
  for element in source_data:
      token = generate_token(element, metadata[element])
      tokens.append(token)
  return tokens
# Step 5: Multi-Level Token Mix-Up Data Augmentation
def multi_level_token_mix_up(tokens, data_lineage):
  """
  Performs multi-level token mix-up data augmentation.
  """
  augmented_tokens = [ ]
  for level, app_data in enumerate(data_lineage.values( )):
      mixed_token = mix_tokens(tokens, app_data)
      augmented_tokens.append(mixed_token)
  return augmented_tokens
# Step 6: Soft Commit Tokens to Target Applications
def soft_commit(augmented_tokens, transaction_path):
  """
  Soft commits augmented tokens to target applications to observe
behavior.
  """
  commit_logs = { }
  for app, token in zip(transaction_path, augmented_tokens):
      response = api_call(app["soft_commit_url"], {"token": token})
      commit_logs[app["name"]] = response["status"]
  return commit_logs
# Step 7: Anomaly Detection
def detect_anomalies(commit_logs):
  """
  Detects anomalies based on responses from soft commits.
  """
  anomalies = [ ]
  for app, status in commit_logs.items( ):
      if status != "success":
          anomalies.append({"app": app, "error": status})
  return anomalies
# Step 8: Map Augmented Tokens to Original Tokens
def map_tokens(original_tokens, augmented_tokens):
  """
      Maps augmented tokens to original tokens to identify
```

-continued

```
discrepancies.
    """
    mappings = { }
    for original, augmented in zip(original_tokens, augmented_tokens):
        mappings[original] = augmented
    return mappings
# Step 9: Log Processing Details
def log_processing_details(transaction_id, data_lineage,
commit_logs, anomalies):
    """
    Logs all details of the processing steps for review and auditing.
    """
    log_entry = {
        "transaction_id": transaction_id,
        "data_lineage": data_lineage,
        "commit_logs": commit_logs,
        "anomalies": anomalies,
    }
    save_to_log_repository(log_entry)
# Step 10: Quantum Encryption Wrapper
def quantum_encrypt(data, metadata):
    """
    Encrypts data and metadata using quantum encryption.
    """
    return quantum_encryption_library.encrypt(data, metadata)
# Step 11: Dynamic Updating of Application Knowledge
def update_application_knowledge(transaction_path):
    """
    Periodically updates knowledge of application-specific data structures.
    """
    updated_data_lineage = { }
    for app in transaction_path:
        response = api_call(app["query_url"], app["params"])
        updated_data_lineage[app["name"]] = response["data_structure"]
    return updated_data_lineage
# Step 12: Scalable Processing
def scalable_processing(transaction_dataset, quantum_model):
    """
      Distributes transaction processing tasks across cloud nodes for
scalability.
    """
    results = [ ]
    for transaction in transaction_dataset:
        encrypted_data = receive_transaction(transaction["data"],
transaction["metadata"])
        data_lineage = query_target_apps(transaction["path"])
        tokens = tokenize_data(transaction["data"], transaction["metadata"])
        augmented_tokens = multi_level_token_mix_up(tokens,
data_lineage)
        commit_logs = soft_commit(augmented_tokens, transaction["path"])
        anomalies = detect_anomalies(commit_logs)
        log_processing_details(transaction["id"], data_lineage,
commit_logs, anomalies)
        results.append({"id": transaction["id"], "anomalies": anomalies})
    return results
```

The pseudocode begins by pre-training the quantum cloud-based model using a dataset of transactions. This prepares the model with knowledge about the transaction types, paths, and application-specific data requirements, ensuring it can accurately simulate and predict data behavior. When a transaction is received, the data and metadata are encrypted using quantum encryption, ensuring security during processing.

The quantum model queries target applications to gather information about their data structures and metadata. This data lineage forms the basis for processing the transaction. The tokenization function converts the source data and metadata into standardized tokens, which can then be augmented using a multi-level token mix-up algorithm. This augmentation ensures that the data is tailored to the requirements of each application.

The augmented tokens are soft-committed to target applications, allowing the system to observe how the data behaves without altering the applications. Based on the responses from these applications, the system detects anomalies and maps the augmented tokens to the original tokens to identify discrepancies. All processing details are logged for review, ensuring transparency and traceability.

The pseudocode also includes a mechanism for updating the system's knowledge of application-specific data structures and provides scalability by distributing transaction processing tasks across cloud nodes. This ensures the system remains dynamic, secure, and capable of handling high transaction volumes efficiently.

A skilled artisan, upon reviewing the disclosure, will appreciate that there are numerous alternatives, modifications, combinations, and customizations that can be made to the systems and methods described herein. These variations allow the invention to be tailored to specific applications, environments, and technological advancements while maintaining its core principles.

One alternative is the use of non-quantum models or hybrid models in place of the quantum cloud-based model. While quantum models provide exceptional speed and accuracy, advanced machine learning models such as neural networks or transformer-based architectures could be employed for scenarios where quantum computing resources are unavailable or unnecessary. Hybrid implementations could leverage quantum models for critical computations while relying on conventional models for less complex tasks.

The tokenization process could be modified to use alternative formats for representing transaction data and metadata. Instead of generating unique tokens, systems could employ widely accepted serialization formats like JSON, XML, or protocol buffers. These formats may simplify integration with external applications while preserving the ability to process data uniformly.

Data augmentation techniques, such as multi-level token mix-up, could be enhanced or replaced with alternative algorithms. For instance, generative adversarial networks (GANs) or variational autoencoders could be utilized to simulate data transformations and augmentations. These advanced models may offer better representation of complex transformations in certain applications.

Soft commit mechanisms can be extended or replaced with intermediate commit modes that allow partial updates to target applications. In scenarios where applications require immediate updates to a subset of their data, these intermediate commits could provide a balance between non-disruptive testing and operational requirements.

Anomaly detection can be combined with advanced anomaly classification systems that leverage explainable artificial intelligence (XAI). This combination would enable not only the detection but also the interpretation and explanation of anomalies, allowing for more informed corrective actions.

Customizations to the encryption mechanism could include the adoption of post-quantum cryptography algorithms. This would enhance security in systems where quantum computing poses a risk to conventional encryption. Additionally, distributed ledger technologies like Holochain could replace or supplement the quantum-encrypted APIs for secure communication.

The architecture could be modified to support edge computing by deploying lightweight components of the system closer to the source or target applications. This modification would reduce latency and improve performance in environments with limited network connectivity or high transaction volumes.

The system could be combined with real-time analytics platforms to provide immediate feedback on transaction behaviors. This combination would allow organizations to dynamically adapt their transaction workflows based on live data insights, further enhancing the system's utility.

Customization options include adjusting the periodicity of application knowledge updates to suit specific operational requirements. For instance, systems with frequently changing application configurations may benefit from continuous updates, while others may require updates only at defined intervals.

Integration with industry-specific standards and protocols could expand the applicability of the system. For example, compliance with ISO standards for financial transactions or HL7 standards for other data could make the system more accessible and relevant to specific domains.

The system's scalability could be enhanced through containerization and orchestration platforms like Kubernetes. This modification would allow dynamic allocation of resources based on workload demands, ensuring optimal performance under varying transaction volumes.

The logging mechanism could be expanded to include advanced visualization tools for processing details. Dashboards and real-time monitoring interfaces could improve user interaction, enabling administrators to view the system's status and diagnose issues quickly.

Combining the described system with robotic process automation (RPA) could automate resolution of anomalies. By integrating RPA scripts, the system could execute corrective actions for detected anomalies without manual intervention, further streamlining operations.

Finally, the invention could be adapted to specific industries by customizing the pre-training dataset. For instance, in the finance sector, datasets could include financial transactions, while in logistics, they could cover supply chain processes. This domain-specific customization would enhance the system's relevance and accuracy in specialized applications.

These alternatives, modifications, combinations, and customizations align with the principles of the disclosed invention, enabling it to address diverse operational needs while maintaining its foundational capabilities for secure, efficient, and adaptable transaction management.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for managing transaction data across a plurality of applications in a multi-application environment, the method comprising:

receiving, by a quantum cloud-based processing system, transaction data and associated metadata from a source application, wherein the transaction data comprises a plurality of data elements and the associated metadata describes attributes of the data elements;

encrypting, by an encryption module within the quantum cloud-based processing system, the transaction data and associated metadata using quantum encryption;

querying, by a querying module within the quantum cloud-based processing system, each application in a transaction path defined by the transaction data to retrieve data structure requirements and metadata specifications for each application, wherein the data structure requirements and metadata specifications describe how the data elements are processed by the respective application;

establishing, by a data lineage module within the quantum cloud-based processing system, a data lineage for the transaction data, the data lineage comprising transformations, translations, and enhancements of the data elements as they traverse the transaction path;

tokenizing, by a tokenization module within the quantum cloud-based processing system, the transaction data and associated metadata into a plurality of tokens, wherein each token represents a data element and its associated metadata;

performing, by a data augmentation module within the quantum cloud-based processing system, multi-level token mix-up data augmentation on the plurality of tokens to generate augmented tokens, wherein the multi-level token mix-up comprises combining existing tokens with newly created tokens based on the data structure requirements and metadata specifications of each application in the transaction path;

soft committing, by a soft commit module within the quantum cloud-based processing system, the augmented tokens to each application in the transaction path, wherein the soft commit comprises transmitting the augmented tokens to the respective application in a preview mode without altering operational characteristics of the respective application;

analyzing, by an anomaly detection module within the quantum cloud-based processing system, responses from the plurality of applications to identify anomalies in the augmented tokens, wherein the anomalies comprise missing data elements, structural mismatches, or discrepancies between the augmented tokens and the data structure requirements of the respective application;

mapping, by a mapping module within the quantum cloud-based processing system, the augmented tokens to the original tokens to identify discrepancies between the augmented tokens and the transaction data;

logging, by a logging module within the quantum cloud-based processing system, details of the querying, tokenizing, augmenting, soft committing, and anomaly detection steps, wherein the logged details comprise application responses, identified anomalies, and mappings of augmented tokens to original tokens;

dynamically updating, by an updating module within the quantum cloud-based processing system, the data structure requirements and metadata specifications for each application in the transaction path based on periodic queries to the respective application; and storing, by a storage module within the quantum cloud-based processing system, the logged details, data lineage, and augmented tokens in a secure repository, wherein the secure repository is accessible for review, analysis, and audit purposes.

2. The method of claim 1, wherein the step of encrypting the transaction data and associated metadata further comprises generating a unique quantum encryption key for each transaction, the unique quantum encryption key being dynamically generated based on the attributes of the transaction data and the associated metadata.

3. The method of claim 2, wherein the querying of each application in the transaction path further comprises establishing secure communication channels with the respective application using the unique quantum encryption key, wherein the secure communication channels prevent unauthorized access to the transaction data and associated metadata during the querying.

4. The method of claim 3, wherein the establishing of the data lineage further comprises creating a hierarchical map of transformations and metadata alterations for each data element, the hierarchical map being dynamically updated based on the responses received from each application in the transaction path.

5. The method of claim 4, wherein the tokenizing of the transaction data and associated metadata further comprises assigning unique identifiers to each token, the unique identifiers enabling precise tracking and mapping of data elements through the transaction path.

6. The method of claim 5, wherein the multi-level token mix-up data augmentation further comprises weighting the augmentation process based on complexity of the transformations and metadata specifications of the applications in the transaction path, wherein the weighting prioritizes high-complexity transformations for more accurate data augmentation.

7. The method of claim 6, wherein the soft committing of the augmented tokens to each application further comprises generating detailed response logs for each application, the detailed response logs comprising success indicators, error codes, and timing data associated with the preview mode.

8. The method of claim 7, wherein the analyzing of responses from the plurality of applications further comprises categorizing the identified anomalies based on their severity, wherein the categories include critical anomalies that prevent transaction completion and non-critical anomalies that allow partial processing of the transaction data.

9. The method of claim 8, wherein the mapping of augmented tokens to the original tokens further comprises generating a discrepancy report, the discrepancy report identifying mismatches between the augmented tokens and the original transaction data, including any detected anomalies and the respective application where the discrepancies occurred.

10. The method of claim 9, wherein the dynamically updating of the data structure requirements and metadata specifications further comprises performing real-time updates during the querying, wherein the real-time updates adjust querying parameters to incorporate new data attributes or application changes identified during the transaction processing.

11. A method for managing transaction data across a plurality of applications in a multi-application environment, the method comprising:

receiving, by a quantum cloud-based processing system, transaction data and associated metadata from a source application, wherein the transaction data comprises a plurality of data elements and the associated metadata describes attributes of the data elements;

encrypting, by an encryption module within the quantum cloud-based processing system, the transaction data and associated metadata using a dynamically generated quantum encryption key, wherein the quantum encryption key is generated based on the attributes of the transaction data and associated metadata;

querying, by a querying module within the quantum cloud-based processing system, each application in a transaction path defined by the transaction data to retrieve data structure requirements and metadata specifications for each application, wherein secure communication channels are established with each application using the quantum encryption key to prevent unauthorized access to the transaction data and associated metadata during the querying;

establishing, by a data lineage module within the quantum cloud-based processing system, a hierarchical map of transformations, translations, and metadata alterations for the transaction data, wherein the hierarchical map is dynamically updated based on responses received from the plurality of applications in the transaction path;

tokenizing, by a tokenization module within the quantum cloud-based processing system, the transaction data and associated metadata into a plurality of tokens, wherein each token represents a data element and its associated metadata and is assigned a unique identifier to enable precise tracking and mapping of data elements through the transaction path;

performing, by a data augmentation module within the quantum cloud-based processing system, multi-level token mix-up data augmentation on the plurality of tokens to generate augmented tokens, wherein the multi-level token mix-up comprises combining existing tokens with newly created tokens based on the data structure requirements and metadata specifications of each application in the transaction path, and wherein augmentation is weighted based on complexity of transformations required by the respective applications;

soft committing, by a soft commit module within the quantum cloud-based processing system, the augmented tokens to each application in the transaction path, wherein the soft commit comprises transmitting the augmented tokens to the respective application in a preview mode without altering operational characteristics of the respective application and generating detailed response logs comprising success indicators, error codes, and timing data;

analyzing, by an anomaly detection module within the quantum cloud-based processing system, responses from the plurality of applications to identify anomalies in the augmented tokens, wherein the anomalies are categorized based on severity, including critical anomalies that prevent transaction completion and non-critical anomalies that allow partial processing of the transaction data;

mapping, by a mapping module within the quantum cloud-based processing system, the augmented tokens to the original tokens to identify discrepancies, wherein the mapping generates a discrepancy report that identifies mismatches between the augmented tokens and the original transaction data and specifies the respective application where the discrepancies occurred;

logging, by a logging module within the quantum cloud-based processing system, details of the querying, tokenizing, augmenting, soft committing, anomaly detection, and mapping steps, wherein the logged details comprise application responses, identified anomalies, and mappings of augmented tokens to original tokens;

dynamically updating, by an updating module within the quantum cloud-based processing system, the data structure requirements and metadata specifications for each application in the transaction path during the querying, wherein the updating incorporates new data attributes or application changes identified during the transaction processing; and storing, by a storage module within the quantum cloud-based processing system, the logged details, hierarchical map, and augmented tokens in a secure repository, wherein the secure repository is accessible for review, analysis, and audit purposes.

12. A system for managing transaction data across a plurality of applications in a multi-application environment, the system comprising:

a quantum cloud-based processing system configured to receive transaction data and associated metadata from a source application, wherein the transaction data comprises a plurality of data elements and the associated metadata describes attributes of the data elements;

an encryption module within the quantum cloud-based processing system configured to encrypt the transaction data and associated metadata using a dynamically generated quantum encryption key, wherein the quantum encryption key is generated based on the attributes of the transaction data and associated metadata;

a querying module within the quantum cloud-based processing system configured to query each application in a transaction path defined by the transaction data to retrieve data structure requirements and metadata specifications for each application, wherein the querying module establishes secure communication channels with each application using the quantum encryption key to prevent unauthorized access to the transaction data and associated metadata during the querying process;

a data lineage module within the quantum cloud-based processing system configured to establish a hierarchical map of transformations, translations, and metadata alterations for the transaction data, wherein the hierarchical map is dynamically updated based on responses received from the plurality of applications in the transaction path;

a tokenization module within the quantum cloud-based processing system configured to tokenize the transaction data and associated metadata into a plurality of tokens, wherein each token represents a data element and its associated metadata and is assigned a unique identifier to enable precise tracking and mapping of data elements through the transaction path;

a data augmentation module within the quantum cloud-based processing system configured to perform multi-level token mix-up data augmentation on the plurality of tokens to generate augmented tokens, wherein the multi-level token mix-up combines existing tokens with newly created tokens based on the data structure requirements and metadata specifications of each application in the transaction path, and wherein augmentation is weighted based on complexity of transformations required by the respective applications;

a soft commit module within the quantum cloud-based processing system configured to soft commit the augmented tokens to each application in the transaction path, wherein the soft commit transmits the augmented tokens to the respective application in a preview mode without altering operational characteristics of the respective application and generates detailed response logs comprising success indicators, error codes, and timing data;

an anomaly detection module within the quantum cloud-based processing system configured to analyze responses from the plurality of applications to identify anomalies in the augmented tokens, wherein the anomalies are categorized based on severity, including critical anomalies that prevent transaction completion and non-critical anomalies that allow partial processing of the transaction data;

a mapping module within the quantum cloud-based processing system configured to map the augmented tokens to the original tokens to identify discrepancies, wherein the mapping module generates a discrepancy report that identifies mismatches between the augmented tokens and the original transaction data and specifies the respective application where the discrepancies occurred;

a logging module within the quantum cloud-based processing system configured to log details of the querying, tokenizing, augmenting, soft committing, anomaly detection, and mapping steps, wherein the logged details comprise application responses, identified anomalies, and mappings of augmented tokens to original tokens;

an updating module within the quantum cloud-based processing system configured to dynamically update the data structure requirements and metadata specifications for each application in the transaction path during the querying process, wherein the updating module incorporates new data attributes or application changes identified during transaction processing; and a storage module within the quantum cloud-based processing system configured to store the logged details, hierarchical map, and augmented tokens in a secure repository, wherein the secure repository is accessible for review, analysis, and audit purposes.

13. The system of claim 12, wherein the encryption module is further configured to generate the quantum encryption key based on a combination of transaction data attributes and dynamic environmental variables, including time of transaction and network conditions.

14. The system of claim 13, wherein the querying module is further configured to prioritize applications in the transaction path based on predefined criteria, including application processing speed, criticality of the application in the transaction path, and historical reliability metrics.

15. The system of claim 14, wherein the data lineage module is further configured to identify dependencies between data elements in the transaction data, and to represent such dependencies as relational links within the hierarchical map for enhanced traceability.

16. The system of claim 15, wherein the tokenization module is further configured to encode metadata attributes, including data transformations, validations, and compatibility flags, within the tokens to ensure detailed tracking through the transaction path.

17. The system of claim 16, wherein the data augmentation module is further configured to apply machine learning-based optimization techniques, including generative adversarial networks, to refine the multi-level token mix-up and improve accuracy of the augmented tokens.

18. The system of claim 17, wherein the soft commit module is further configured to log resource utilization metrics, including memory usage and processing time, for each application in the transaction path during the preview mode to provide operational insights.

19. The system of claim 18, wherein the anomaly detection module is further configured to generate an anomaly impact report, wherein the report quantifies the impact of detected anomalies on transaction processing, including delay estimation and likelihood of transaction failure.

20. The system of claim 19, wherein the updating module is further configured to continuously monitor external changes to application data requirements through automated API polling and to incorporate such changes into real-time updates of the querying process.

* * * * *